US011807215B2

(12) United States Patent
Maruyama et al.

(10) Patent No.: US 11,807,215 B2
(45) Date of Patent: Nov. 7, 2023

(54) BRAKE CONTROL DEVICE FOR VEHICLES

(71) Applicant: ADVICS CO., LTD., Kariya (JP)

(72) Inventors: Masaki Maruyama, Nagoya (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 392 days.

(21) Appl. No.: 17/251,414

(22) PCT Filed: Jun. 21, 2019

(86) PCT No.: PCT/JP2019/024629
§ 371 (c)(1),
(2) Date: Dec. 11, 2020

(87) PCT Pub. No.: WO2020/004241
PCT Pub. Date: Jan. 2, 2020

(65) Prior Publication Data
US 2021/0276534 A1    Sep. 9, 2021

(30) Foreign Application Priority Data
Jun. 26, 2018    (JP) .................. 2018-120580

(51) Int. Cl.
*B60W 20/14*    (2016.01)
*B60T 13/66*    (2006.01)
(Continued)

(52) U.S. Cl.
CPC .......... *B60W 20/14* (2016.01); *B60T 13/662* (2013.01); *B60T 13/667* (2013.01); *B60W 10/08* (2013.01);
(Continued)

(58) Field of Classification Search
CPC .... B60W 20/14; B60W 10/08; B60W 10/188; B60W 2510/244; B60W 10/192; B60W 2710/182; B60T 13/662; B60T 13/667
See application file for complete search history.

(56) References Cited

U.S. PATENT DOCUMENTS

2007/0228821 A1    10/2007    Maki et al.
2018/0264949 A1    9/2018    Kaneko et al.
(Continued)

FOREIGN PATENT DOCUMENTS

JP    2007276655 A    10/2007
JP    2013018411 A    1/2013
(Continued)

OTHER PUBLICATIONS

International Search Report (PCT/ISA/210) dated Sep. 10, 2019, by the Japan Patent Office as the International Searching Authority for International Application No. PCT/JP2019/024629.
(Continued)

*Primary Examiner* — Pamela Rodriguez
(74) *Attorney, Agent, or Firm* — BUCHANAN INGERSOLL & ROONEY PC

(57) ABSTRACT

A brake control device is applied to a vehicle including a regenerative generator. The brake control device includes a pressure adjustment unit that includes an electric pump and a pressure adjustment valve, and that adjusts adjustment liquid pressure of a pressure adjustment fluid path between the electric pump and the pressure adjustment valve; and a controller that controls the electric pump and the pressure adjustment valve. The controller, before starting a replacement operation to replace a regenerative braking force by the regenerative generator with a friction braking force by the adjustment liquid pressure, performs preceding pressurization to increase the adjustment liquid pressure from "0" and maintain the adjustment liquid pressure at predetermined
(Continued)

liquid pressure, and after performing the preceding pressurization, increases the adjustment liquid pressure more than the predetermined liquid pressure by increasing a rotation speed of the electric pump, and then execute the replacement operation.

3 Claims, 7 Drawing Sheets

(51) Int. Cl.
*B60W 10/08* (2006.01)
*B60W 10/188* (2012.01)
*B60W 10/192* (2012.01)

(52) U.S. Cl.
CPC ........ *B60W 10/188* (2013.01); *B60W 10/192* (2013.01); *B60W 2510/244* (2013.01); *B60W 2710/182* (2013.01)

(56) References Cited

U.S. PATENT DOCUMENTS

| | | | |
|---|---|---|---|
| 2019/0176628 A1* | 6/2019 | Nakata | B60T 8/17 |
| 2020/0247379 A1* | 8/2020 | Yamamoto | B60T 8/1766 |
| 2021/0197779 A1* | 7/2021 | Maruyama | B60T 13/146 |
| 2021/0221231 A1* | 7/2021 | Maruyama | B60T 13/586 |
| 2021/0229648 A1* | 7/2021 | Yamamoto | B60T 13/586 |

FOREIGN PATENT DOCUMENTS

| | | |
|---|---|---|
| JP | 2017060343 A | 3/2017 |
| JP | 2019137203 A | 8/2019 |

OTHER PUBLICATIONS

Written Opinion (PCT/ISA/237) dated Sep. 10, 2019, by the Japan Patent Office as the International Searching Authority for International Application No. PCT/JP2019/024629.

* cited by examiner

BRAKE CONTROL DEVICE FOR VEHICLES

TECHNICAL FIELD

The present disclosure relates to a brake control device for a vehicle.

BACKGROUND ART

A patent document (Japanese Patent Unexamined Publication Application 2007-276655) discloses that "in order to improve delay in rising of liquid pressure braking force at the start of replacement, prior to the start of replacement, a rotation speed of a motor is increased such that the rotation speed of the motor becomes a rotation speed that can compensate for a decrease in a regenerative braking force when pump pressurization is started. A brake liquid amount supplied by the pump is not insufficient, wheel cylinder pressure according to a differential pressure instruction value of a second differential pressure control valve is generated, and deceleration before the replacement can be maintained even after the replacement."

Specifically, the document discloses that "at the start of braking, a required braking force of a driver is generated by a total braking force obtained by adding a regenerative braking force generated by a regenerative braking device to a liquid braking force generated in a master cylinder by master cylinder pressure based on a force obtained by boosting an operation force of a brake pedal with a boost device. With the passage of time, the regenerative braking force is replaced with the liquid braking force due to the pump pressurization. The motor is set to a high rotation speed in advance before starting the replacement such that the liquid pressure braking force due to the pump pressurization can follow the decrease in the regenerative braking force at the start timing of the replacement, in other words, such that an amount of brake liquid supplied to a wheel cylinder when performing the pump pressurization is not insufficient."

SUMMARY OF INVENTION

Technical Problem

An object of the disclosure is to provide a brake control device for a vehicle capable of ensuring sufficient pressure-rise responsiveness even when brake liquid pressure that causes friction braking is increased from "0" in a replacement operation between regenerative braking and friction braking.

Solution to Problem

A brake control device (SC) for a vehicle according to the disclosure is applied to a vehicle including a regenerative generator (GN) connected to wheels (WH) of the vehicle. The brake control device (SC) includes a pressure adjustment unit (YC) that includes an electric pump (DC) and a pressure adjustment valve (UA, UC), and that adjusts adjustment liquid pressure (Pa, Pc) of a pressure adjustment fluid path (HC) between the electric pump (DC) and the pressure adjustment valve (UA, UC); and a controller (ECU) that controls the electric pump (DC) and the pressure adjustment valve (UA, UC).

In the brake control device (SC) for a vehicle according to the disclosure, the controller (ECU), before starting a replacement operation to replace a regenerative braking force (Fg) by the regenerative generator (GN) with a friction braking force (Fm, Fmf) by the adjustment liquid pressure (Pa, Pc), performs preceding pressurization to increase adjustment liquid pressure (Pa, Pc) from "0" and maintain the adjustment liquid pressure (Pa, Pc) at predetermined liquid pressure (pp), and after performing the preceding pressurization, increases the adjustment liquid pressure (Pa, Pc) larger than the predetermined liquid pressure (pp) by increasing a rotation speed (Na) of the electric pump (DC), and then executes the replacement operation.

When brake liquid pressure is "0", a gap is generated between a rotation member and a friction material due to vibration or the like of the rotation member. A friction surface of the friction material (sliding surface with the rotation member) may be inclined with respect to a surface of the rotation member. Further, fine irregularities exist on a surface of the friction material. Therefore, the brake liquid pressure starts to increase from "0" after the gap between the rotation member and the friction material disappears and the surface irregularities of the friction material are crushed. According to the above configuration, a brake liquid amount (initial consumption liquid amount) corresponding to the gap, the inclination, the surface irregularities, and the like is replenished before the replacement operation, and the brake liquid pressure is slightly increased to the predetermined liquid pressure pp. Therefore, in the replacement operation, responsiveness in pressure increase and pressure adjustment accuracy can be improved.

DESCRIPTION OF EMBODIMENTS

<Symbols of Components, Etc. and Subscripts at Ends of Symbols>

In the following description, components, calculation processing, signals, characteristics, and values having the same symbols, such as "ECU", have the same function. Subscripts "i" to "l" appended to ends of symbols relating to wheels are comprehensive symbols indicating which wheel each of the symbols is related to. Specifically, "i" denotes a right front wheel, "j" denotes a left front wheel, "k" denotes a right rear wheel, and "l" denotes a left rear wheel. For example, among four wheel cylinders, the right front wheel wheel cylinder is denoted as CWi, the left front wheel wheel cylinder is denoted as CWj, the right rear wheel wheel cylinder is denoted as CWk, and the left rear wheel wheel cylinder is denoted as CW1. The subscripts "i" to "l" at the ends of the symbols may be omitted. When the subscripts "i" to "l" are omitted, each symbol represents a general term for each of the four wheels. For example, "WH" represents each wheel and "CW" represents each wheel cylinder.

Subscripts "1" and "2" appended to ends of symbols relating to diagonal type braking systems are comprehensive symbols indicating which system of the two braking systems each of the symbols is related to. Specifically, "1" indicates a first system, and "2" indicates a second system. For example, in two master cylinder fluid paths, a first master cylinder valve is denoted as VM1 and a second master cylinder valve is denoted as VM2. The subscripts "1" and "2" at the ends of the symbols may also be omitted. When the subscripts "1" and "2" are omitted, each symbol represents a general term for each of the two braking systems. For example, "VM" represents a master cylinder valve of each braking system.

Subscripts "f" and "r" appended to ends of symbols relating to a front and rear type braking system are comprehensive symbols indicating which system of front and rear wheels each of the symbols is related to. Specifically, "f" indicates a front wheel system and "r" indicates a rear wheel system. For example, in a wheel cylinder CW of all the wheels, front wheel wheel cylinders are denoted as CWf (=CWi, CWj) and rear wheel wheel cylinders are denoted as CWr (=CWk, CW1). The subscripts "f" and "r" at the ends of the symbols may also be omitted. When the subscripts "f" and "r" are omitted, each symbol represents a general term for each of the two braking systems. For example, "CW" represents wheel cylinders in the front and rear type braking system.

In a fluid path, a side closer to a reservoir RV is referred to as an "upper portion", and a side closer to the wheel cylinder CW is referred to as a "lower portion". In addition, in recirculation (A) of a brake liquid BF, a side closer to a discharge portion of a fluid pump HP is referred to as an "upstream side", and a side away from the discharge portion is referred to as a "downstream side".

<First Embodiment of Brake Control Device SC>

Figure 1:
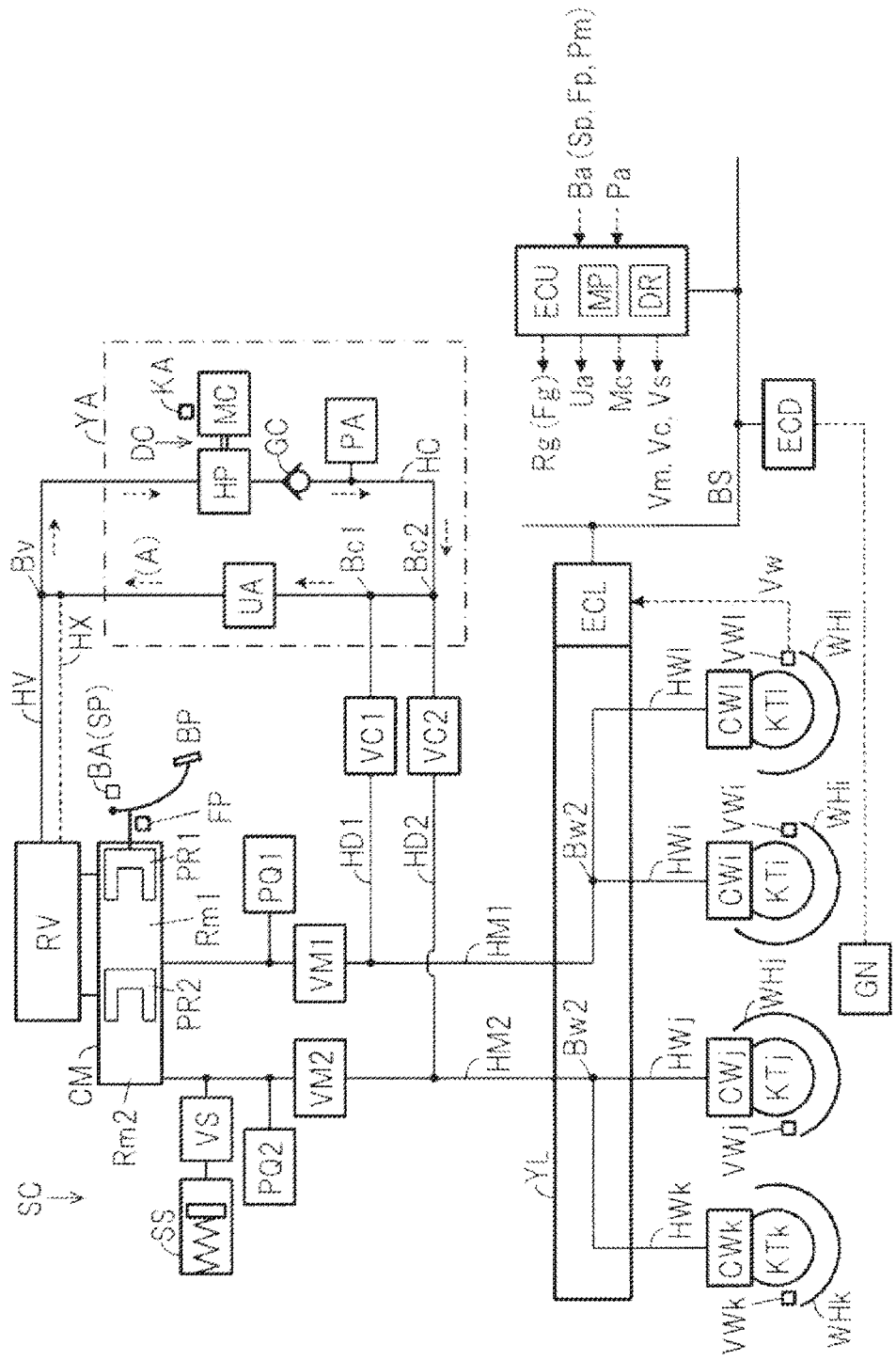
FIG. 1 is an overall configuration diagram for illustrating a first embodiment of a brake control device SC for a vehicle according to the disclosure.

A first embodiment of a brake control device SC according to the disclosure will be described with reference to an overall configuration diagram of FIG. 1. In the first embodiment, a so-called diagonal type (also referred to as "X type") is employed as a two-system fluid path. Here, the fluid path is a path for moving the brake liquid BF, which is a working liquid of the brake control device SC, and corresponds to a brake pipe, a flow path of a fluid unit, a hose, and the like. A so-called front and rear type fluid path may be employed as the two-system fluid path.

A vehicle is a hybrid vehicle including an electric motor GN for driving, or an electric automobile. The electric motor GN for driving also functions as a generator for energy regeneration (power generator). For example, the generator GN is connected to front wheels WHi and WHj (=WHf). That is, the front wheel WHf is a regenerative wheel. The vehicle includes a brake operation member BP, wheel cylinders CWs, the reservoir RV, a master cylinder CM, a lower portion fluid unit YL, and wheel speed sensors VWs.

The brake operation member (for example, brake pedal) BP is a member operated by a driver to decelerate the vehicle. When the brake operation member BP is operated, braking torque of the wheel WH is adjusted, and a braking force (friction braking force) is generated in the wheel WH. Specifically, a rotation member (for example, a brake disk) KT is fixed to the wheel WH of the vehicle. A brake caliper is disposed so as to sandwich the rotation member KT.

The brake caliper is provided with the wheel cylinder CW. By increasing pressure (brake liquid pressure) Pw of the brake liquid BF in the wheel cylinder CW, a friction member (for example, brake pad) is pressed against the rotation member KT. Since the rotation member KT and the wheel WH are fixed so as to rotate integrally, the braking torque (friction braking force) is generated in the wheel WH due to a frictional force generated when a surface of the rotation member KT and the friction surface of the friction material are slid on each other.

The reservoir (atmospheric pressure reservoir) RV is a tank for working liquid, and the brake liquid BF is stored therein. The master cylinder CM is mechanically connected to the brake operation member BP. A tandem type master cylinder CM is employed as the master cylinder CM. When the brake operation member BP is not operated, the master cylinder CM and the reservoir RV are in communication with each other. When the brake operation member BP is operated, first and second master cylinder chambers Rm1 and Rm2 formed by an inner wall of the master cylinder CM and first and second master pistons PR1 and PR2 are cut off from the reservoir RV. When an operation amount Ba of the brake operation member BP is increased, a volume of the master cylinder chamber Rm decreases, and the brake liquid BF is pressure-fed from the master cylinder CM.

First and second master cylinder fluid paths HM1 and HM2 are connected to the master cylinder CM. Wheel cylinder fluid paths HWi to HW1 are connected to wheel cylinders CWi to CW1. The master cylinder fluid path HM is branched into the wheel cylinder fluid paths HW at a portion Bw in the lower portion fluid unit YL. Therefore, the first master cylinder chamber Rm1 is connected to the wheel cylinders CWi and CW1, and the second master cylinder chamber Rm2 is connected to the wheel cylinders CWj and CWk.

The lower portion fluid unit YL is a known fluid unit for executing anti-skid control, vehicle stabilization control, and the like. The lower portion fluid unit YL includes an electric pump and a plurality of solenoid valves. These components are controlled by a lower portion controller ECL.

Each wheel WH is provided with a wheel speed sensor VW so as to detect a wheel speed Vw. A signal of the wheel speed Vw is employed for the anti-skid control that prevents lock tendency of the wheel WH or the like. Each wheel speed Vw detected by the wheel speed sensor VW is input to the lower portion controller ECL. In the controller ECL, a vehicle body speed Vx is calculated based on the wheel speed Vw.

«Brake Control Device SC»

The brake control device SC includes an operation amount sensor BA, a stroke simulator SS, a simulator valve VS, master cylinder valves VM, a pressure adjustment unit YA, and an upper portion controller ECU.

The operation amount sensor BA is provided to detect the operation amount Ba of the brake operation member (brake pedal) BP operated by the driver. At least one of a master cylinder liquid pressure sensor PQ that detects pressure Pm of the master cylinder CM, an operation displacement sensor SP that detects operation displacement Sp of the brake operation member BP, and an operation force sensor FP that detects an operation force Fp of the brake operation member BP is employed as the brake operation amount sensor BA. That is, at least one of the master cylinder liquid pressure Pm, the operation displacement Sp, and the operation force Fp is detected by the operation amount sensor BA as the brake operation amount Ba.

The stroke simulator (also simply referred to as a "simulator") SS is provided to generate the operation force Fp on the brake operation member BP. That is, operation characteristics (relationship between the operation displacement Sp and the operation force Fp) of the brake operation member BP are formed by the simulator SS. The simulator valve VS is provided between the master cylinder chamber Rm and the simulator SS. The simulator valve VS is a normally-closed solenoid valve (ON/OFF valve) having an open position and a closed position. When the brake control device SC is activated, the simulator valve VS is set to the open position, and the master cylinder CM and the simulator SS are brought into a communication state.

First and second master cylinder valves VM1 and VM2 are provided on the first and second master cylinder fluid paths HM1 and HM2, respectively. The master cylinder valve VM is a normally-opened solenoid valve (ON/OFF valve) having an open position and a closed position. When the brake control device SC is activated, the master cylinder valve VM is set to the closed position, and the master cylinder CM and the wheel cylinder CW are brought into a cut-off state (non-communication state).

[Pressure Adjustment Unit YA]

The brake liquid pressure Pw is controlled by the pressure adjustment unit YA. The pressure adjustment unit YA includes an electric pump DC, a check valve GC, a pressure adjustment valve UA, an adjustment liquid pressure sensor PA, and separation valve VCs.

The electric pump DC includes an electric motor MC and a fluid pump HP. In the electric pump DC, the electric motor MC and the fluid pump HP rotate integrally. The electric pump DC (in particular, the electric motor MC) is a power source for increasing the brake liquid pressure Pw. The electric motor MC is controlled by the upper portion controller ECU.

A reservoir fluid path HV is connected to an absorption port of the fluid pump HP. A pressure adjustment fluid path HC is connected to a discharge port of the fluid pump HP. By driving the electric pump DC (in particular, the fluid pump HP), the brake liquid BF is absorbed from the reservoir fluid path HV and discharged to the pressure adjustment fluid path HC. For example, a gear pump is employed as the fluid pump HP.

The check valve GC (also referred to as a "check valve") is interposed in the pressure adjustment fluid path HC. The check valve GC allows the brake liquid BF to move from the reservoir fluid path HV to the pressure adjustment fluid path HC, and prevents the brake liquid BF from moving from the pressure adjustment fluid path HC toward the reservoir fluid path HV (that is, backflow of the brake liquid BF).

The pressure adjustment valve UA is connected to the pressure adjustment fluid path HC and the reservoir fluid path HV. The pressure adjustment valve UA is a normally-opened linear solenoid valve (also referred to as "proportional valve" or "differential pressure valve") in which a valve opening amount (lift amount) is continuously controlled based on an energization state (for example, supply current).

When the electric pump DC is operated, the brake liquid BF recirculates in an order of "HV to HP to GC to UA to HV" as shown by a broken line arrow (A). That is, in the pressure adjustment unit YA, a recirculation path of the brake liquid BF (a fluid path in which a flow of the brake liquid BF returns to an original flow) including the fluid pump HP, the check valve GC, and the pressure adjustment valve UA is formed.

The pressure adjustment valve UA may be connected to the reservoir RV via a second reservoir fluid path HX that is different from the first reservoir fluid path HV. In this case, the recirculation path (A) of the brake liquid BF includes the reservoir RV, and is in an order of "HV to HP to GC to UA to HX to RV to HV".

When the pressure adjustment valve UA is in a fully open state (when not energized), liquid pressure (adjustment liquid pressure) Pa in the pressure adjustment fluid path HC is low, and is approximately "0 (atmospheric pressure)". When an energization amount supplied to the pressure adjustment valve UA is increased and the recirculation path (A) is narrowed by the pressure adjustment valve UA, the adjustment liquid pressure Pa is increased. That is, the adjustment liquid pressure Pa is adjusted by an orifice effect of the pressure adjustment valve UA. The pressure adjustment fluid path HC is provided with the adjustment liquid pressure sensor PA so as to detect the adjustment liquid pressure Pa. The detected adjustment liquid pressure Pa is input to the controller ECU.

The pressure adjustment fluid path HC is connected to the first and second master cylinder fluid paths HM1 and HM2 via first and second introduction fluid paths HD1 and HD2. Specifically, each introduction fluid path HD is connected between a portion Bc in the pressure adjustment fluid path HC and a portion Bw in the master cylinder fluid path HM. The separation valve VC is provided on the way of the introduction fluid path HD. The separation valve VC is a normally-closed solenoid valve (ON/OFF valve) having an open position and a closed position. When the brake control device SC is activated, the separation valve VC is set to the open position. Therefore, when the brake control device SC is operated, since the master cylinder valve VM is set to the closed position, the adjustment liquid pressure Pa is introduced (supplied) from the pressure adjustment unit YA to the wheel cylinders CWs. That is, the same adjustment liquid pressure Pa is supplied to the four wheel cylinders CWi to CW1. This control is referred to as "equivalent pressure adjustment".

The upper portion controller (also referred to as "upper portion electronic control unit") ECU includes a microprocessor MP, an electric circuit board where a drive circuit DR is mounted, and a control algorithm programmed in the microprocessor MP. The electric motor MC and the various solenoid valves VM, VS, VC, and UA are controlled by the controller ECU based on various signals (such as Ba). Specifically, based on a control algorithm in the microprocessor MP, drive signals Vm, Vs, Vc, and Ua for controlling the various solenoid valves VM, VS, VC, and UA are calculated. A drive signal Mc for controlling the electric motor MC is calculated in the same way. Based on the drive signals Vm, Vs, Vc, Ua and Mc, the solenoid valves VM, VS, VC, UA, and the electric motor MC are driven.

The controller ECU is network-connected to another controller via an in-vehicle communication bus BS. A regeneration amount Rg is transmitted from the controller ECU to a drive controller ECD so as to execute cooperative control (so-called regenerative cooperative control) between friction braking and regenerative braking. The "regeneration amount Rg" is a state quantity indicating magnitude of a regenerative braking force generated by the drive motor GN. In addition, the vehicle body speed Vx calculated by the lower portion controller ECL is transmitted to the upper portion controller ECU via the communication bus BS.

The controller ECU is provided with the drive circuit DR so as to drive the solenoid valves VM, VS, VC, UA, and the electric motor MC. A bridge circuit is formed in the drive circuit DR by a switching element (power semiconductor device such as MOS-FET or IGBT) so as to drive the electric motor MC. An energization state of each switching element is controlled based on the motor drive signal Mc, and output of the electric motor MC is controlled. In addition, in the drive circuit DR, excitation states of the solenoid valves VM, VS, VC, and UA are controlled based on the drive signals Vm, Vs, Vc, and Ua so as to drive the solenoid valves VM, VS, VC, and UA.

<First Processing Example of Pressure Adjustment Control>

Figure 2:
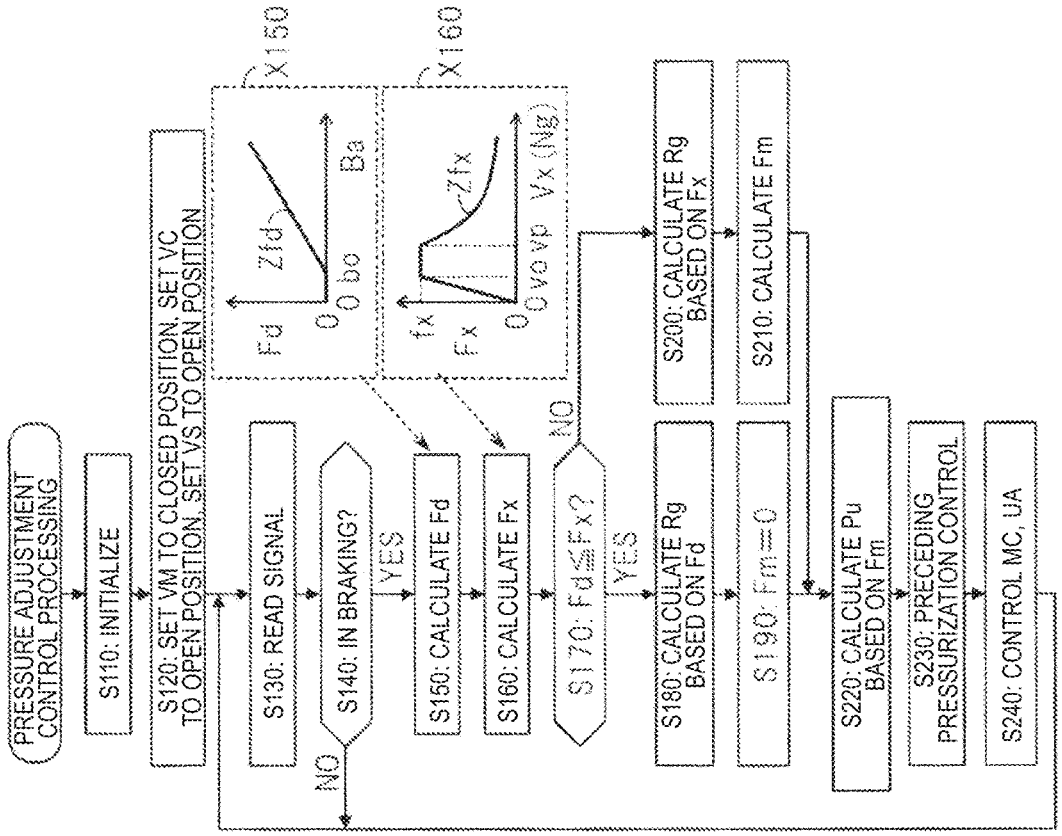
FIG. 2 is a control flowchart for illustrating a first processing example of pressure adjustment control corresponding to the first embodiment.

A first processing example of pressure adjustment control corresponding to the first embodiment will be described with reference to a control flowchart of FIG. 2. The pressure adjustment control is drive control of the electric motor MC and the pressure adjustment valve UA for controlling the adjustment liquid pressure Pa. An algorithm of the control is programmed in the upper portion controller ECU.

In step S110, the brake control device SC is initialized, and initial diagnosis of each component is executed. In step S120, the solenoid valves VM, VC, and VS are energized. That is, when activation switch of the device SC is turned on, the simulator valve VS and the separation valve VC are set to the open position, and the master cylinder valve VM is set to the closed position.

In step S130, the brake operation amount Ba, the adjustment liquid pressure (detected value) Pa, and the vehicle body speed Vx are read. The operation amount Ba is detected by the operation amount sensor BA (operation displacement sensor SP, master cylinder liquid pressure sensor PQ, and operation force sensor FP). The adjustment liquid pressure Pa is detected by the adjustment liquid pressure sensor PA. The vehicle body speed Vx is acquired from the lower portion controller ECL via the communication bus BS. The vehicle body speed Vx may be calculated by the upper portion controller ECU based on the wheel speed Vw input to the upper portion controller ECU.

In step S140, "whether or not brake is being performed" is determined based on the brake operation amount Ba. For example, when the operation amount Ba is larger than a predetermined value bo, step S140 is determined as YES, and the processing moves to step S150. On the other hand, when the operation amount Ba is equal to or less than the predetermined value bo, the determination in step S140 is determined as NO, and the processing returns to step S130. Here, the predetermined value bo is a preset constant corresponding to play of the brake operation member BP.

In step S150, as shown in a block X150, a required braking force Fd is calculated based on the operation amount Ba. The required braking force Fd is a target value of a total braking force F acting on the vehicle, and is a braking force obtained by combining "a friction braking force Fm by the brake control device SC" with "a regenerative braking force Fg by the generator GN". The required braking force Fd is determined to be "0" in a range where the operation amount Ba is between "0" and the predetermined value bo according to a calculation map Zfd, and is calculated to monotonically increase from "0" as the operation amount Ba increases when the operation amount Ba is equal to or greater than the predetermined value bo.

In step S160, as shown in a block X160, a maximum value of the regenerative braking force (referred to as "maximum regenerative force") Fx is calculated based on the vehicle body speed Vx and a calculation map Zfx. The regeneration amount Rg of the generator GN is limited by rating of a power transistor (such as IGBT) of the drive controller ECD and charge acceptability of a battery. For example, the regeneration amount Rg of the generator GN is controlled to be a predetermined electric power (electric energy per unit time). Since the electric power (power) is constant, regenerative torque of the generator GN around a wheel axle is inversely proportional to a rotation speed of the wheel WH (that is, the vehicle body speed Vx). In addition, when a rotation speed Ng of the generator GN decreases, the regeneration amount Rg decreases. Further, the regeneration amount Rg is provided with an upper limit value.

In the calculation map Zfx for the maximum regenerative force Fx, the maximum regenerative force Fx is set to increase in accordance with an increase in the vehicle body speed Vx which is in a range equal to or greater than "0" and less than a first predetermined speed vo. In a range where the vehicle body speed Vx is equal to or greater than the first predetermined speed vo and less than a second predetermined speed vp, the maximum regenerative force Fx is determined to be an upper limit value fx. When the vehicle body speed Vx is equal to or greater than the second predetermined speed vp, the maximum regenerative force Fx is set to decrease as the vehicle body speed Vx increases. For example, in decrease characteristics of the maximum regenerative force Fx (characteristics of "Vx≥vp"), a relationship between the vehicle body speed Vx and the maximum regenerative force Fx is represented by a hyperbola (that is, a regenerative electric power is constant). Here, each of the predetermined values vo and vp is a preset constant. In the calculation map Zfx, the rotation speed Ng of the generator GN may be employed instead of the vehicle body speed Vx.

In step S170, "whether or not the required braking force Fd is equal to or less than the maximum regenerative force Fx" is determined based on the required braking force Fd and the maximum regenerative force Fx. That is, it is determined whether the braking force Fd required by a driver can be achieved only by the regenerative braking force Fg. When "Fd≤Fx" and step S170 is determined as YES, the processing moves to step S180. On the other hand, when "Fd>Fx" and step S170 is determined as NO, the processing moves to step S200.

In step S180, the required braking force Fd is determined to be the regenerative braking force Fg (that is, "Fg=Fd"). Then, the regeneration amount Rg is calculated based on the regenerative braking force Fg. The regeneration amount Rg is a target value of the regeneration amount of the generator GN. The regeneration amount Rg is transmitted from the braking controller ECU to the drive controller ECD via the communication bus BS.

In step S190, the target friction braking force Fm is calculated to be "0" (that is, "Fm=0"). The target friction braking force Fm is a target value of a braking force to be achieved by friction braking. In this case, friction braking is not employed for vehicle deceleration, and the required braking force Fd is achieved only by regenerative braking.

In step S200, the regenerative braking force Fg is determined to be the maximum regenerative force Fx (that is, "Fg=Fx"). Then, the regeneration amount Rg is calculated based on the regenerative braking force Fg (=Fx). Similar to the above, the regeneration amount Rg is transmitted to the drive controller ECD through the communication bus BS.

In step S210, the target friction braking force Fm is calculated based on the required braking force Fd and the maximum regenerative power Fx. Specifically, the target friction braking force Fm is determined by subtracting the maximum regenerative force Fx from the required braking force Fd (that is, "Fm=Fd−Fx"). That is, insufficiency of the regenerative braking force Fg (=Fx) in the required braking force Fd is compensated by the target friction braking force Fm.

In step S220, required liquid pressure Pu is calculated based on the target value Fm of the friction braking force. The required liquid pressure Pu is a target value of the adjustment liquid pressure Pa. Specifically, the target friction braking force Fm is converted into the liquid pressure, and the required liquid pressure Pu is determined.

In step S230, preceding pressurization control is executed based on the vehicle body speed Vx (or the generator rotation speed Ng) and the adjustment liquid pressure Pa (detected value of the adjustment liquid pressure sensor PA). The "preceding pressurization control" is a control in which brake liquid pressure Pw (=Pa) is increased from "0" to a predetermined liquid pressure pp and maintained at the value before the replacement operation to replace "regenerative braking force Fg by regenerative generator GN" with "friction braking force Fm by brake liquid pressure Pw" is started. Here, the "replacement operation" is to compensate for the decrease in the regenerative braking force Fg by increasing the friction braking force Fm. When the adjustment liquid pressure Pa is slightly increased to the predetermined liquid pressure pp by the preceding pressurization control, it is called "preceding pressurization". In other words, after the preceding pressurization is performed, the replacement operation of the regenerative cooperative control is started.

In step S230, target liquid pressure Pt is determined based on the required liquid pressure Pu and presence or absence of the preceding pressurization. The target liquid pressure Pt is a final target value of the adjustment liquid pressure Pa.

In step S240, the electric motor MC is driven, and the recirculation path (A) of the brake liquid BF including the fluid pump HP and the pressure adjustment valve UA is formed. Further, the pressure adjustment valve UA is feedback-controlled such that the adjustment liquid pressure Pa approaches and matches the target liquid pressure Pt based on the target liquid pressure Pt and the adjustment liquid pressure (detected value of the adjustment liquid pressure sensor PA) Pa. Details of processing of the electric motor MC and the pressure adjustment valve UA will be described below.

<Drive Processing of Electric Motor MC and Pressure Adjustment Valve UA>

Figure 3:
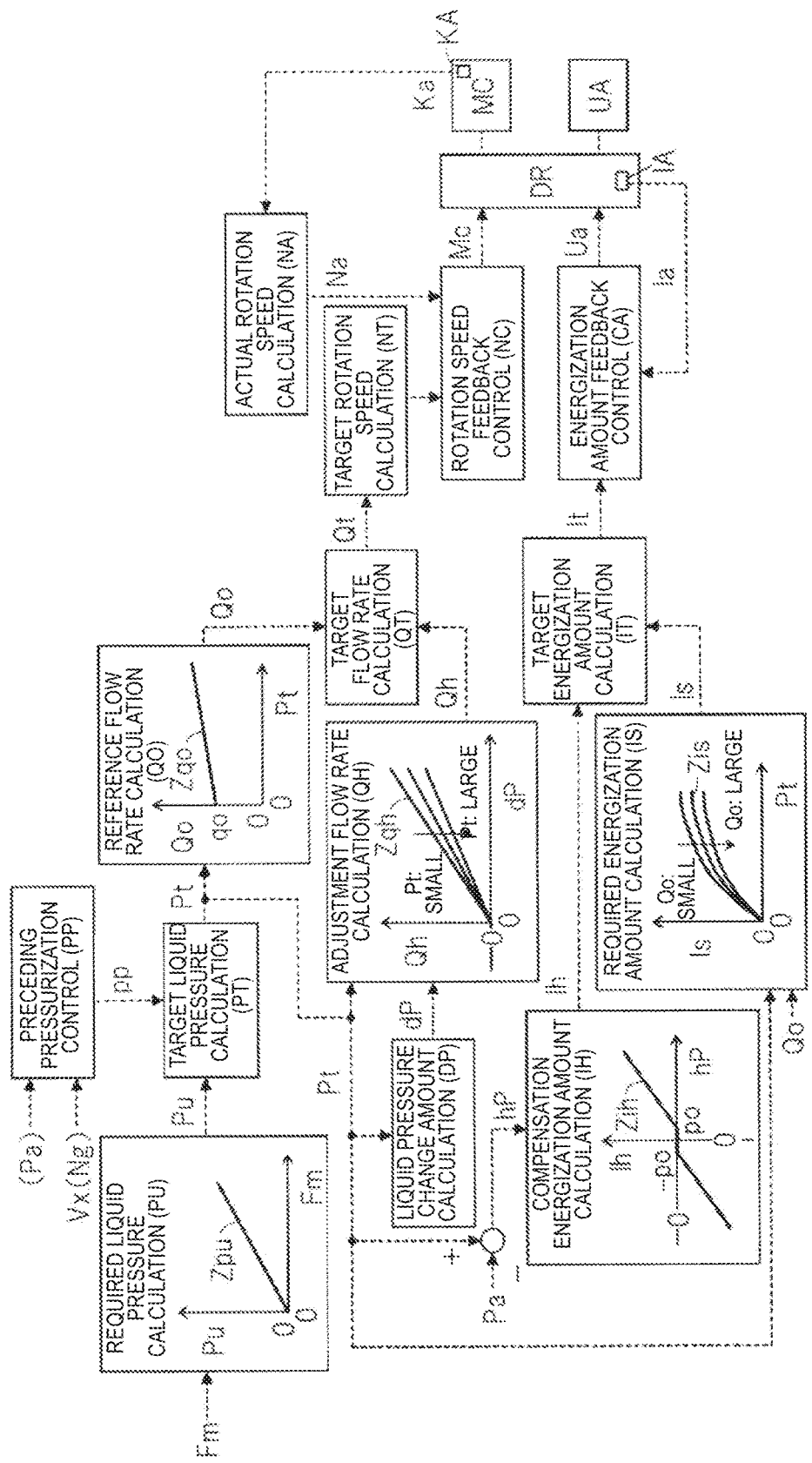
FIG. 3 is a functional block diagram for illustrating drive processing of an electric motor MC and a pressure adjustment valve UA.

Drive processing of the electric motor MC and the pressure adjustment valve UA will be described with reference to a functional block diagram of FIG. 3. The processing is programmed in the upper portion controller ECU.

«Drive Control of Electric Motor MC»

First, drive control of the electric motor MC will be described. The processing includes a required liquid pressure calculation block PU, a preceding pressurization control block PP, a target liquid pressure calculation block PT, a reference flow rate calculation block QO, a liquid pressure change amount calculation block DP, an adjustment flow rate calculation block QH, a target flow rate calculation block QT, a target rotation speed calculation block NT, an actual rotation speed calculation block NA, and a rotation speed feedback control block NC.

In the required liquid pressure calculation block PU, the required liquid pressure Pu is calculated based on the target friction braking force Fm and a calculation map Zpu. The required liquid pressure Pu is a target value of the adjustment liquid pressure Pa adjusted by the pressure adjustment unit YA. The required liquid pressure Pu is determined to monotonically increase from "0" as the target friction braking force Fm increases from "0" in accordance with the calculation map Zpu.

In the preceding pressurization control block PP, whether or not the preceding pressurization is necessary is determined based on the vehicle body speed Vx and the adjustment liquid pressure Pa. In the preceding pressurization, prior to the start of the replacement operation between the regenerative braking force Fg and the friction braking force Fm, the brake liquid pressure Pw is slightly increased and maintained up to the predetermined liquid pressure pp. Here, the predetermined liquid pressure pp is a preset predetermined value (small constant) such that the influence of vehicle deceleration does not occur and the entire friction surface (sliding surface) of the friction material (brake pad) comes into contact with the rotation member (brake disk).

As shown in the block X160, as the vehicle body speed Vx decreases, the regenerative braking force Fg decreases. Specifically, when the vehicle body speed Vx becomes equal to or less than the first predetermined speed vo, the regenerative braking force Fg starts to decrease. Accordingly, at "Vx=vo", the displacement operation is started. Nothing is output from the preceding pressurization control block PP when the vehicle body speed Vx is larger than a predetermined speed vx. When the vehicle body speed Vx reaches the predetermined speed vx, the predetermined liquid pressure pp is output as the preceding pressurization control. Here, the predetermined speed (threshold speed) vx is a preset threshold value (constant) which is larger than the first predetermined speed vo. Since the relationship "vx>vo" is satisfied, the predetermined liquid pressure pp of the preceding pressurization is output before the replacement operation.

In the target liquid pressure calculation block PT, the target liquid pressure Pt is calculated based on the required liquid pressure Pu and the predetermined liquid pressure pp. The target liquid pressure Pt is a final target value of the adjustment liquid pressure Pa. Specifically, when there is no output from the preceding pressurization control block PP (when the preceding pressurization control is not executed), the required liquid pressure Pu is directly determined as the target liquid pressure Pt. When the preceding pressurization control is executed, a larger one of the required liquid pressure Pu and the predetermined liquid pressure pp is determined as the target liquid pressure Pt. In other words, if the required liquid pressure Pu is equal to or greater than the predetermined liquid pressure pp, the preceding pressurization control is not executed (that is, the control is prohibited). When "Pu≥pp", it is based on the fact that no preceding pressurization needs to be executed.

In the reference flow rate calculation block QO, a reference flow rate Qo is calculated based on the target liquid pressure Pt and a calculation map Zqo. The reference flow rate Qo is a target value of a discharge amount (flow rate) of the electric pump DC (that is, the fluid pump HP) that is minimally required to adjust the liquid pressure by the orifice effect of the pressure adjustment valve UA. The reference flow rate Qo is determined so as to monotonically increase from a predetermined flow rate qo as the target liquid pressure Pt increases from. "0" in accordance with the calculation map Zqo. This is based on the fact that internal leakage of the fluid pump HP increases as the liquid pressure increases. The predetermined flow rate qo is a preset constant.

In the liquid pressure change amount calculation block DP, a liquid pressure change amount dP is calculated based on the target liquid pressure Pt. Specifically, the target liquid pressure Pt is time-differentiated to determine the liquid pressure change amount dP. The liquid pressure change amount dP is calculated so as to increase as the operation speed dB (time change amount of the operation amount Ba) of the brake operation member BP increases.

In the adjustment flow rate calculation block QH, an adjustment flow rate Qh is calculated based on the liquid pressure change amount dP, the target liquid pressure Pt, and a calculation map Zqh. The adjustment flow rate Qh is a target value of a discharge flow rate of the electric pump DC which is necessary for increasing the adjustment liquid pressure Pa. The adjustment flow rate Qh is calculated to be "0" when the liquid pressure change amount dP is equal to or less than "0" in accordance with the calculation map Zqh, and is determined so as to monotonically increase from "0" as the liquid pressure change amount dP increases from "0". The adjustment flow rate Qh is determined to be larger as the liquid pressure change amount dP increases such that a large amount of brake liquid BF is supplied to the wheel cylinder CW. That is, when the brake operation member BP is held (that is, "dP=0") or when the brake operation member BP is returned (that is, "dP<0"), "Qh=0" is determined.

In addition, the adjustment flow rate Qh is determined, according to the calculation map Zqh, to be larger as the target liquid pressure Pt decreases, and is determined to be smaller as the target liquid pressure Pt increases. This is because the adjustment liquid pressure Pa (as a result, brake liquid pressure Pw) increases according to rigidity (non-linear spring constant) of the brake caliper, friction material, and the like. That is, a large amount of flow rate is required when the adjustment liquid pressure Pa is low, while the flow rate is not so required when the adjustment liquid pressure Pa is high. Therefore, the adjustment flow rate Qh is determined to be larger as the target liquid pressure Pt decreases.

In the target flow rate calculation block QT, a target flow rate Qt is calculated based on the reference flow rate Qo and the adjustment flow rate Qh. The target flow rate Qt is a target value of a discharge flow rate of the electric pump DC (that is, the fluid pump HP). Specifically, the target flow rate Qt is determined by adding up the reference flow rate Qo and the adjustment flow rate Qh (that is, "Qt=Qo+Qh"). In the target rotation speed calculation block NT, a target rotation speed Nt is calculated based on the target flow rate Qt. The target rotation speed Nt is a target value of a rotation speed of the electric pump DC (in particular, the electric motor MC). Since a discharge amount per rotation of the fluid pump HP is known, the target flow rate Qt is converted into the target rotation speed Nt. In the actual rotation speed calculation block NA, an actual rotation speed Na is calculated based on an actual rotation angle Ka (detected value of a rotation angle sensor KA). Specifically, the actual rotation angle Ka is time-differentiated to determine the actual rotation speed Na.

In the rotation speed feedback control block NC, rotation speed feedback control of the electric motor MC is executed based on the target rotation speed Nt and the actual rotation speed Na. That is, the drive signal Mc is determined such that the actual rotation speed Na approaches the target rotation speed Nt and finally matches the target rotation speed Nt. The switching element of the drive circuit DR is driven based on the drive signal Mc, and the electric motor MC is controlled.

«Drive Control of Pressure Adjustment Valve UA»

Next, drive control of the pressure adjustment valve UA will be described. The processing includes a target liquid pressure calculation block PT, a liquid pressure change amount calculation block DP, a required energization amount calculation block IS, a compensation energization amount calculation block IH, a target energization amount calculation block IT, and an energization amount feedback control block CA. Since the target liquid pressure calculation block PT and the liquid pressure change amount calculation block DP are common processing with the electric motor MC, a description thereof will be omitted.

In the required energization amount calculation block IS, a required energization amount Is is calculated based on the target liquid pressure Pt, the reference flow rate Qo, and a calculation map Zis. The required energization amount Is is a target value of an energization amount (current) supplied to the pressure adjustment valve UA. The required energization amount Is is determined to monotonically increase from "0" according to an "upward protruding" characteristic as the target liquid pressure Pt increases from "0" in accordance with the calculation map Zis. The required energization amount Is is calculated based on a flow rate to be supplied to the pressure adjustment valve UA. Specifically, the required energization amount Is is determined, according to the calculation map Zis, to be larger as the reference flow rate Qo decreases, and is determined to be smaller as the reference flow rate Qo increases. Since the pressure adjustment valve UA is normally-opened, the required energization amount Is is calculated to be smaller as the reference flow rate Qo increases, and the valve opening amount of the pressure adjustment valve UA is increased. The brake liquid BF corresponding to the adjustment flow rate Qh is moved toward the wheel cylinder CW in order to increase the brake liquid pressure Pw.

In the compensation energization amount calculation block IH, a compensation energization amount Ih is calculated based on a deviation hP between the target liquid pressure Pt and the adjustment liquid pressure Pa and a calculation map Zih. The compensation energization amount Ih is a target value of an energization amount (current) supplied to the pressure adjustment valve UA to cause the adjustment liquid pressure Pa to match the target liquid pressure Pt. First, the adjustment liquid pressure Pa (detected value of the adjustment liquid pressure sensor PA) is subtracted from the target liquid pressure Pt to calculate the liquid pressure deviation hP (that is, "hP=Pt−Pa"). When the deviation hP is equal to or less than a predetermined value "−po" and the deviation hP is equal to or greater than a predetermined value po, the compensation energization amount Ih is determined to increase as the liquid pressure deviation hP increases. In addition, in a range where the liquid pressure deviation hP is between the predetermined value "−po" and the predetermined value po, the compensation energization amount Ih is set to "0". Here, the predetermined value po is a preset positive constant.

In the target energization amount calculation block IT, a target energization amount It is calculated based on the required energization amount Is and the compensation energization amount Ih. The target energization amount It is a final target value of the energization amount (current) supplied to the pressure adjustment valve UA. Specifically, the required energization amount Is and the compensation energization amount Ih are added together to calculate the target energization amount It (that is, "It=Is+Ih").

In the energization amount feedback control block CA, energization amount feedback control of the pressure adjustment valve UA is executed based on the target energization amount It and an actual energization amount Ia. That is, the drive signal Ua is determined such that the actual energization amount Ia matches the target energization amount It.

Here, the actual energization amount Ia is detected by an energization amount sensor IA provided in the drive circuit DR. The drive circuit DR is driven based on the drive signal Ua, and the pressure adjustment valve UA is controlled.

When the liquid pressure change amount dP is larger than "0", the adjustment flow rate Qh is calculated to be larger than "0". The adjustment flow rate Qh is determined to be larger as the liquid pressure change amount dP increases (as an increase gradient of the adjustment liquid pressure Pa increases). As a result, when "dP>0", the target rotation speed Nt increases as the liquid pressure change amount dP increases. Meanwhile, when the adjustment liquid pressure Pa is maintained constant, the reference flow rate Qo is sufficient for a flow rate of the brake liquid BF (discharge flow rate of the electric pump DC). The same also applies to a case where the adjustment liquid pressure Pa decreases. Therefore, when the liquid pressure change amount dP is equal to or less than "0", the adjustment flow rate Qh is calculated to be "0". Therefore, when the operation of the brake operation member BP is increased and then held or decreased, the increased target rotation speed Nt is decreased.

The liquid pressure change amount dP corresponding to the operation of the brake operation member BP is calculated, the rotation speed of the electric pump DC (in particular, the electric motor MC) is determined, and the electric pump DC (in particular, the fluid pump HP) does not discharge any unnecessary flow rate, so that the brake control device SC can be power saving. Further, when a rapid increase in the brake liquid pressure Pw is required (for example, when the brake operation member BP is suddenly operated), the rotation speed Na of the electric motor MC is rapidly increased, and a sufficient liquid amount (volume of the brake liquid BF) is supplied to the wheel cylinder CW. Therefore, pressure-rise responsiveness of the brake liquid pressure Pw is improved, time delay in feedback control based on the deviation hP is reduced, and thus pressure adjustment accuracy of the brake liquid pressure Pw is ensured.

Further, since the pressure adjustment unit YA is provided with the check valve GC, when the pressure adjustment valve UA is completely closed, the adjustment liquid pressure Pa can be kept constant. In addition, when the pressure adjustment valve UA is slightly opened, the adjustment liquid pressure Pa can be gradually decreased. When the liquid pressure change amount dP is equal to or less than "0" (that is, when the brake operation member BP is held or returned), "Qo=0" is set and the target flow rate Qt can be determined to be "0". As a result, rotation of the electric pump DC (=MC) is stopped (that is, "Nt=0"). When the brake operation member BP is held or returned, the electric motor MC is stopped, so that power saving is further achieved. When the brake liquid pressure Pw is increased from the state where the electric motor MC is stopped, the target flow rate Qt can be determined to be the adjustment flow rate Qh (that is, "Qt=Qh").

When the adjustment liquid pressure Pa (that is, brake liquid pressure Pw) is "0", a gap is generated between the rotation member KT and the friction material due to the vibration of the rotation member KT or the like (vibration of the rotation member sliding surface with respect to a surface perpendicular to a rotation axis). The friction surface of the friction material (surface that slides on the surface of the rotation member KT) may be inclined with respect to the surface (sliding surface) of the rotation member KT. Further, the surface (sliding surface) of the friction material is not a uniform flat surface, and fine irregularities exist. Therefore, the adjustment liquid pressure Pa starts to increase from "0" after the gap between the rotation member KT and the friction material sliding surface and the inclination of the friction material sliding surface with respect to the rotation member KT are eliminated and the surface irregularities of the friction material are crushed. A brake liquid amount corresponding to the gap, the inclination, the surface irregularities, and the like is consumed (referred to as "initial consumption liquid amount"). In the brake control device SC, the preceding pressurization is performed such that the liquid amount (volume of the brake liquid BF) corresponding to the initial consumption liquid amount is supplied before the replacement operation is started. Specifically, when "Pu=0", based on the vehicle body speed Vx, "Pt=pp" is determined before the maximum regenerative force Fx is reduced, and the adjustment liquid pressure Pa (=Pw) is increased to the predetermined liquid pressure pp and held. Here, the predetermined liquid pressure pp is liquid pressure that does not affect the deceleration of the vehicle, eliminates the above-mentioned gap and inclination, and causes the entire sliding surface of the friction material to come into contact with the rotation member KT, and is a preset constant. By the preceding pressurization, the responsiveness of pressure increase and the pressure adjustment accuracy in the replacement operation can be ensured.

The preceding pressurization is for replenishing the initial consumption liquid amount. Therefore, when the adjustment liquid pressure Pa before the preceding pressurization is equal to or greater than the predetermined liquid pressure pp, execution of the preceding pressurization is prohibited. Specifically, in the target liquid pressure calculation block PT, a larger one of the required liquid pressure Pu and the predetermined liquid pressure pp is determined as the final target liquid pressure Pt. In the preceding pressurization control block PP, when a start condition of the preceding pressurization control (that is, "Vx≤vx") is satisfied, when the adjustment liquid pressure Pa is equal to or greater than the predetermined liquid pressure pp based on the adjustment liquid pressure Pa, nothing may be output (that is, the predetermined liquid pressure pp may not be output). In the preceding pressurization control block PP, instead of the vehicle body speed Vx, the generator rotation speed Ng may be employed as an execution condition of the preceding pressurization control.

<Operation and Effect According to First Embodiment>

Figure 4:
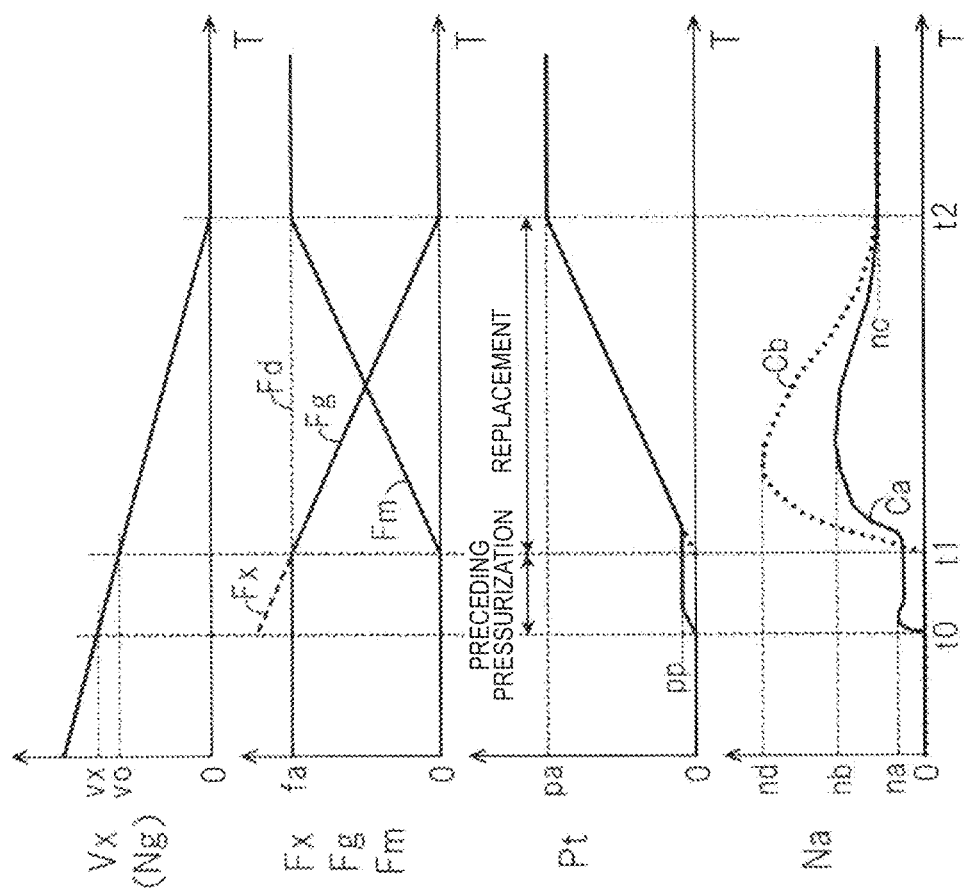
FIG. 4 is a time series diagram for illustrating operation and effects according to the first embodiment.

Operation and effects according to the first embodiment will be described with reference to a time series diagram of FIG. 4.

In the brake control device SC, the target liquid pressure Pt is calculated according to the operation amount Ba of the brake operation member BP, and the liquid pressure change amount dP is calculated based on the target liquid pressure Pt. The rotation speed Na of the electric pump DC is adjusted based on the liquid pressure change amount dP. Specifically, when "dP≤0", the rotation speed Na of the electric pump DC is maintained at "0 (stop)" or a constant value. When "dP>0", the rotation speed Na is increased such that the larger the liquid pressure change amount dP, the larger the rotation speed Na. Here, in the diagram, it is assumed that a situation in which the required braking force Fd is maintained constant and the electric pump DC is stopped when "dP=0".

A state of "Fd=fa" is maintained. Since "Fd<Fx" is satisfied until a time point t0, "Fg=fa, Fm=0" is determined. Further, since "dP=0", "Na=0 (stopping the electric motor MC)" is satisfied. At the time point t0, the vehicle body speed Vx falls to the predetermined speed vx. Since the start condition "Vx≤vx" of the preceding pressurization control is satisfied, the predetermined liquid pressure pp is output and an increase in the target liquid pressure Pt is started. The target liquid pressure Pt (as a result, adjustment liquid pressure Pa) is gradually increased to the predetermined liquid pressure pp with a predetermined increase gradient so as to avoid the influence on the vehicle deceleration, and is then maintained at the predetermined liquid pressure pp. Since the target liquid pressure Pt is increased from the time point t0, "dP>0" is calculated, and the target rotation speed Nt is increased from "0". Therefore, the actual rotation speed Na is increased to a value na.

At a time point t1, since the vehicle body speed Vx reaches the first predetermined speed vo and the maximum regenerative force Fx is reduced, the regenerative braking force Fg is reduced. The friction braking force Fm is increased to compensate for the decrease in the regenerative braking force Fg. As the friction braking force increases, the target liquid pressure Pt (as a result, the adjustment liquid pressure Pa, brake liquid pressure Pw) is increased from the predetermined liquid pressure pp. Accordingly, a braking force F acting on the vehicle matches the required braking force Fd (=fa). That is, at the time point t1 after the preceding pressurization is performed, the replacement operation between the regenerative braking force Fg and the friction braking force Fm is started. As the target liquid pressure Pt increases in the replacement operation, the liquid pressure change amount dP increases and the target rotation speed Nt increases. As a result, the actual rotation speed Na is increased to a value nb (see characteristic Ca).

At a time point t2, the replacement operation is completed. After the time point t2, since the adjustment liquid pressure Pa is kept constant, the rotation speed Na is decreased to a value nc. The rotation speed Na may be "0 (stop)" by setting the pressure adjustment valve UA to a fully closed state.

In the brake control device SC, since the electric pump DC is driven as necessary, power saving is achieved. Specifically, when "dP≤0", the electric pump DC is stopped (that is, "Nt, Na=0") or driven at a low rotation speed (that is, a rotation speed corresponding to the reference flow rate Qo"). Then, when "dP>0", the target rotation speed Nt (as a result, the actual rotation speed Na) is controlled to be larger as the liquid pressure change amount dP is larger.

When the adjustment liquid pressure Pa is increased from "0", first, the brake liquid BF corresponding to the initial consumption liquid amount needs to be supplied to the wheel cylinder CW. Here, the initial consumption liquid amount is a volume of the brake liquid BF necessary for filling the gap between the rotation member KT and the friction material, correcting the inclination between the rotation member KT and the friction material, crushing the irregularities on the friction material surface, and bringing the entire surface of the friction material into contact with the rotation member KT. A case where the preceding pressurization control is not executed is indicated by a dotted line characteristic Cb. As the target liquid pressure Pt increases, the rotation speed Na is rapidly increased to a value nd based on the liquid pressure change amount dP. However, a delay may occur in the supply of the brake liquid BF due to inertia mass of the electric pump DC. Therefore, the responsiveness of the adjustment liquid pressure Pa is difficult to be ensured. In addition, since the rotation speed Na is suddenly increased, a problem of operation noise may occur.

In the brake control device SC, when the replacement operation is performed in the state of "Pa=0", the preceding pressurization control is executed before the start of the replacement operation (time point t0). By the preceding pressurization control, the brake liquid BF corresponding to the initial consumption liquid amount is supplied, and the pressure-rise responsiveness of the adjustment liquid pressure Pa can be ensured. Further, as the target liquid pressure Pt increases, the increase in the rotation speed Na does not become too large, and the operation noise is small.

<Second Embodiment of Brake Control Device SC>

Figure 5:
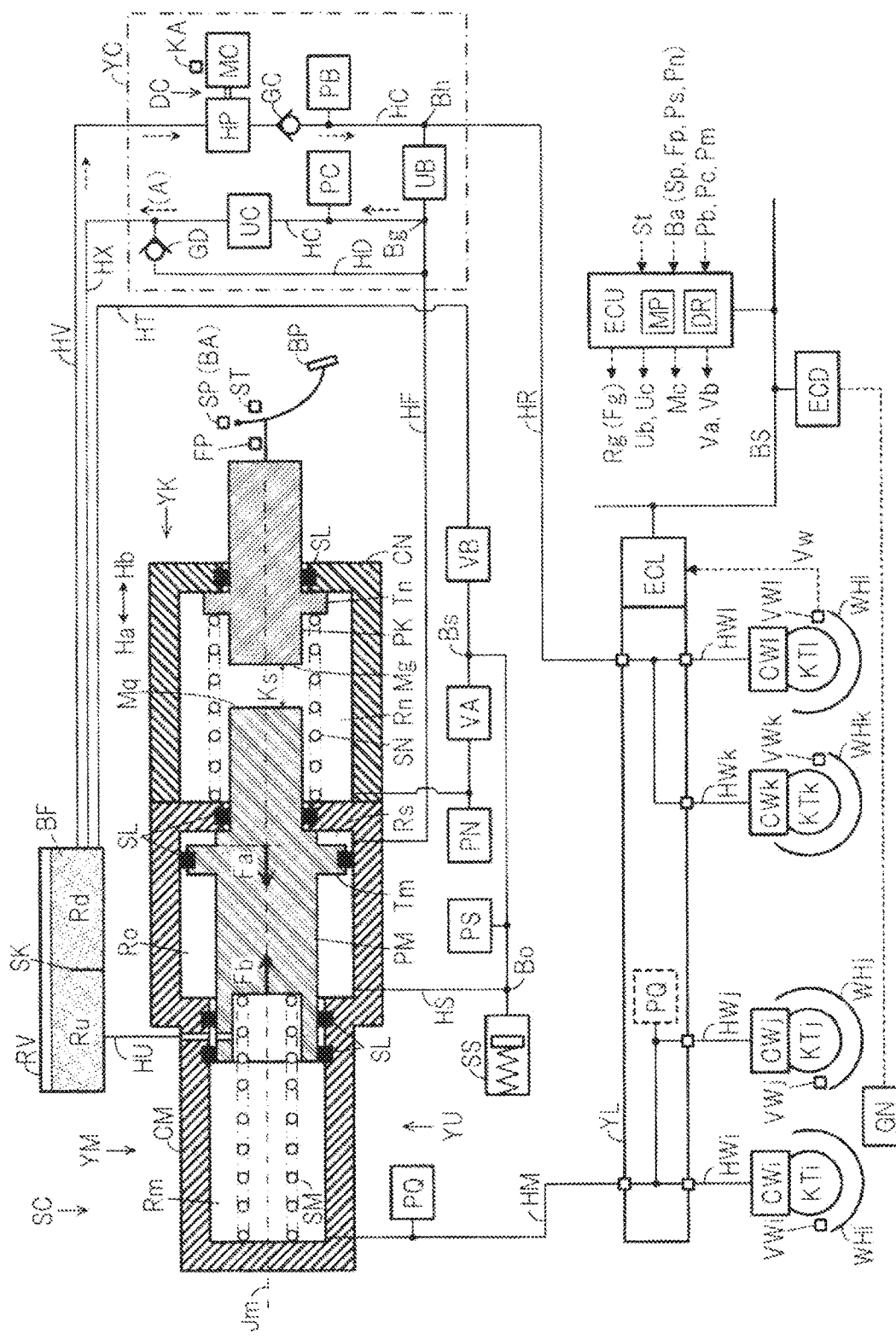
FIG. 5 is an overall configuration diagram for illustrating a second embodiment of the brake control device SC for a vehicle according to the disclosure.

A second embodiment of the brake control device SC according to the disclosure will be described with reference to an overall configuration diagram of FIG. 5. In the second embodiment, a so-called front and rear type fluid path is employed as a two-system fluid path. In the first embodiment, the adjustment liquid pressure Pa is supplied to the four wheel cylinders CWs to perform the "equivalent pressure adjustment". However, in the second embodiment, the front wheel wheel cylinders CWf and the rear wheel wheel cylinders CWr are individually controlled. This control is referred to as "independent pressure adjustment".

Similar to the above, components, calculation processing, signals, characteristics, and values having the same symbols have the same functions. Subscripts "i" to "l" appended to ends of symbols relating to wheels are comprehensive symbols indicating which wheel each of the symbols is related to. Specifically, "i" denotes a right front wheel, "j" denotes a left front wheel, "k" denotes a right rear wheel, and "l" denotes a left rear wheel. The subscripts "i" to "l" at the ends of the symbols may be omitted. In this case, each symbol represents a general term for each of the four wheels. Subscripts "f" and "r" appended to ends of symbols relating to a front and rear type braking system are comprehensive symbols indicating which system of front and rear wheels each of the symbols is related to. "f" indicates a front wheel system and "r" indicates a rear wheel system. In addition, subscripts "1" and "2" appended to ends of symbols relating to diagonal type braking systems are comprehensive symbols indicating which system each of the symbols is related to. "1" indicates a first system, and "2" indicates a second system. The subscripts "f", "r", "1", and "2" at the ends of the symbols may be omitted. In this case, each symbol represents a general term for each of the two braking systems.

«Brake Control Device SC»

The brake control device SC according to the second embodiment includes an upper portion fluid unit YU. The upper portion fluid unit YU is controlled by the upper portion controller ECU. As in the first embodiment, in the second embodiment, the lower portion fluid unit YL controlled by the lower portion controller ECL is also provided in the vehicle. The upper portion controller ECU and the lower portion controller ECL are connected via the communication bus BS such that signals (such as sensor detected values and calculation values) are shared.

In the second embodiment, the generator GN is provided in the front wheel WHf (regenerative wheel). The upper portion fluid unit YU in the second embodiment includes the operation amount sensor BA, the master unit YM, a pressure adjustment unit YC, and a regeneration cooperation unit YK.

The operation amount sensor BA is provided to detect the operation amount Ba of the brake operation member (brake pedal) BP. As the operation amount sensor BA, in addition to an operation displacement sensor SP and an operation force sensor FP, a simulator liquid pressure sensor PS which detects liquid pressure (simulator liquid pressure) Ps in the simulator SS, and an input liquid pressure sensor PN which detects liquid pressure (input liquid pressure) Pn in an input chamber Rn of the regeneration coordination unit YK are provided. That is, at least one of the operation displacement Sp, the operation force Fp, the simulator liquid pressure Ps, and the input liquid pressure Pn is employed as the brake operation amount Ba. The detected brake operation amount Ba is input to the upper portion controller ECU. It should be noted that the master cylinder liquid pressure Pm does not correspond to the operation amount Ba in the second embodiment.

[Master Unit YM]

The master unit YM adjusts liquid pressure (front wheel brake liquid pressure) Pwf in the front wheel wheel cylinder CWf via the master cylinder chamber Rm. The master unit YM includes the master cylinder CM, the master piston PM, and a master elastic body SM.

The master cylinder CM is a stepped cylinder member (that is, including a small diameter portion and a large diameter portion) including a bottom portion. A single type master cylinder CM is employed as the master cylinder CM. The master piston PM is a piston member inserted into the master cylinder CM, and includes a flange portion (flange) Tm. The master cylinder CM and the master piston PM are sealed by a seal SL. The master piston PM can move in conjunction with an operation of the brake operation member BP. An interior of the master cylinder CM is partitioned by the master piston PM into three liquid pressure chambers Rm, Rs, and Ro. The master piston PM can move smoothly along a central axis Jm of the master cylinder CM.

The master cylinder chamber (also simply referred to as a "master chamber") Rm is a liquid pressure chamber partitioned by "a small diameter inner peripheral portion and a small diameter bottom portion of the master cylinder CM", and an end portion of the master piston PM. The master cylinder fluid path HM is connected to the master chamber Rm, and is finally connected to the front wheel wheel cylinder CWf (=CWi, CWj) via the lower portion fluid unit YL.

The interior of the master cylinder CM is partitioned into the servo liquid pressure chamber (also simply referred to as a "servo chamber") Rs and the reaction force liquid pressure chamber (also simply referred to as a "reaction force chamber") Ro by the flange portion Tm of the master piston PM. The servo chamber Rs is a liquid pressure chamber partitioned by "a large diameter inner peripheral portion and a large diameter bottom portion of the master cylinder CM", and the flange portion Tm of the master piston PM. The master chamber Rm and the servo chamber Rs are disposed to face each other with the flange portion Tm interposed therebetween. A front wheel pressure adjustment fluid path HF is connected to the servo chamber Rs, and an adjustment liquid pressure Pc is introduced from the pressure adjustment unit YC.

The reaction force chamber Ro is a liquid pressure chamber partitioned by the large diameter inner peripheral portion and a stepped portion of the master cylinder CM, and the flange portion Tm of the master piston PM. The reaction force chamber Ro is sandwiched by the master liquid pressure chamber Rm and the servo liquid pressure chamber Rs in a direction of the central axis Jm, and is located therebetween. A simulator fluid path HS is connected to the reaction force chamber Ro.

The master elastic body (for example, a compression spring) SM is provided between the end portion of the master piston PM and the small diameter bottom portion of the master cylinder CM. The master elastic body SM presses the master piston PM against the large diameter bottom portion of the master cylinder CM in the direction of the central axis Jm of the master cylinder CM. When not braking, the master piston PM abuts against the large diameter bottom portion of the master cylinder CM. In this state, the master chamber Rm is in communication with the reservoir RV.

The master chamber Rm applies an urging force Fb in a backward direction Hb (referred to as a "retracting force") along the central axis Jm to the master piston PM by internal pressure thereof ("master cylinder liquid pressure", also referred to as "master liquid pressure") Pm. The servo chamber Rs applies an urging force Fa in a forward direction Ha (referred to as an "advancing force") that faces the retracting force Fb to the master piston PM by internal pressure thereof (that is, the introduced adjustment liquid pressure Pc). That is, in the master piston PM, the advancing force Fa provided by the liquid pressure Pc in the servo chamber Rs and the retracting force Fb provided by the liquid pressure (master liquid pressure) Pm in the master chamber Rm oppose each other (face each other) in the direction of the central axis Jm and are statically balanced. The master cylinder liquid pressure sensor PQ is provided to detect the master liquid pressure Pm. For example, the master cylinder liquid pressure sensor PQ may be provided in the master cylinder fluid path HM. In addition, the master cylinder liquid pressure sensor PQ may also be provided in the lower portion fluid unit YL.

[Pressure Adjustment Unit YC]

The pressure adjustment unit YC includes the electric pump DC, the check valve GC, first and second pressure adjustment valves UB and UC, and first and second adjustment liquid pressure sensors PB and PC. The liquid pressure (front wheel brake liquid pressure) Pwf of the front wheel wheel cylinder CWf and the liquid pressure (rear wheel brake liquid pressure) Pwr of the rear wheel wheel cylinder CWr are independently and individually adjusted by the pressure adjustment unit YC. Specifically, the brake liquid pressure Pwf of the front wheel WHf where the generator GN is provided is independently adjusted within a range equal to or less than the brake liquid pressure Pwr of the rear wheel WHr where the generator GN is not provided.

The electric pump DC includes the electric motor MC and the fluid pump HP which rotate integrally. In the fluid pump HP, an absorption port is connected to a first reservoir fluid path HV, and a discharge port is connected to one end portion of a pressure adjustment fluid path HC. The pressure adjustment fluid path HC is provided with the check valve GC. The other end portion of the pressure adjustment fluid path HC is connected to a second reservoir fluid path HX via the second pressure adjustment valve UC. The first and second reservoir fluid paths HV and HX are connected to the reservoir RV.

The two pressure adjustment valves UB and UC are provided in series in the pressure adjustment fluid path HC. Specifically, the first pressure adjustment valve UB is provided in the pressure adjustment fluid path HC. The second pressure adjustment valve UC is disposed at the other end of the pressure adjustment fluid path HC. An end portion of the second reservoir fluid path HX is connected to the second pressure adjustment valve UC. Similar to the pressure adjustment valve UA, the first and second pressure adjustment valves UB and UC are normally-opened linear solenoid valves (proportional valve, differential pressure valve) in which a valve opening amount (lift amount) is continuously controlled based on an energization state (for example, supply current).

When the electric pump DC is driven, the recirculation (A) of the brake liquid BF is formed as "HV to HP to GC to UB to UC to HX to RV to HV". That is, the fluid pump HP, the first and second pressure adjustment valves UB and UC, and the reservoir RV are provided in the recirculation path (A) of the brake liquid BF. As described in the first embodiment, the second pressure adjustment valve UC may also be connected to the first reservoir fluid path HV. In this case, the recirculation path (A) is in an order of "HV to HP to GC to UB to UC to HV".

When the first and second pressure adjustment valves UB and UC are in the fully open state, both the liquid pressures (first and second adjustment liquid pressure) Pb and Pc in the pressure adjustment fluid path HC are approximately "0 (atmospheric pressure)". When the energization amount to the first pressure adjustment valve UB is increased and the recirculation (A) is narrowed by the pressure adjustment valve UB, a liquid pressure on the upstream side of the first pressure adjustment valve UB in the pressure adjustment fluid path HC (for example, the liquid pressure (first adjustment liquid pressure) Pb between the fluid pump HP and the first pressure adjustment valve UB) is increased from "0". In addition, when the energization amount to the second pressure adjustment valve UC is increased and the recirculation (A) is narrowed by the pressure adjustment valve UC, a liquid pressure on the upstream side of the second pressure adjustment valve UC in the pressure adjustment fluid path HC (for example, the liquid pressure (second adjustment liquid pressure) Pc between the first pressure adjustment valve UB and the second pressure adjustment valve UC) is increased from "0".

Since the first and second pressure adjustment valves UB and UC are disposed in series with respect to the pressure adjustment fluid path HC, the second adjustment liquid pressure Pc adjusted by the second pressure adjustment valve UC is equal to or less than the first adjustment liquid pressure Pb. In other words, the second adjustment liquid pressure Pc is adjusted by the second pressure adjustment valve UC to increase from "0 (atmospheric pressure)", and the first adjustment liquid pressure Pb is adjusted by the first pressure adjustment valve UB to increase from the second adjustment liquid pressure Pc. The first and second adjustment liquid pressure sensors PB and PC are provided in the pressure adjustment unit YC so as to detect the first and second adjustment liquid pressures Pb and Pc. Since specifications of the master unit YM (such as a pressure receiving area of the master piston PM) are known, the master cylinder liquid pressure sensor PQ may be used instead of the second adjustment liquid pressure sensor PC. That is, the second adjustment liquid pressure sensor PC can be omitted.

The pressure adjustment fluid path HC is branched into a rear wheel pressure adjustment fluid path HR at a portion Bh between the fluid pump HP and the first pressure adjustment valve UB. The rear wheel pressure adjustment fluid path HR is connected to the rear wheel wheel cylinder CWr via the lower portion fluid unit YL. In addition, the pressure adjustment fluid path HC is branched into a front wheel pressure adjustment fluid path HF at a portion Bg between the first pressure adjustment valve UB and the second pressure adjustment valve UC. The front wheel pressure adjustment fluid path HF is connected to the servo chamber Rs. Therefore, the second adjustment liquid pressure Pc is introduced (supplied) to the servo chamber Rs.

[Regeneration Cooperation Unit YK]

Cooperative control of the friction braking and the regenerative braking (referred to as "regenerative cooperative control") is achieved by the regeneration cooperation unit YK. For example, a state where the brake liquid pressure Pw is not generated while the brake operation member BP is operated can be formed by the regeneration cooperation unit YK. The regeneration cooperation unit YK includes an input cylinder CN, an input piston PK, an input elastic body SN, a first on-off valve VA, a second on-off valve VB, the stroke simulator SS, the simulator liquid pressure sensor PS, and the input liquid pressure sensor PN.

The input cylinder CN is a cylinder member including a bottom portion and fixed to the master cylinder CM. The input piston PK is a piston member inserted into the input cylinder CN. The input piston PK is mechanically connected to the brake operation member BP so as to be interlocked with the brake operation member BP. The input piston PK is provided with a flange portion (flange) Tn, and the input elastic body (for example, a compression spring) SN is provided between the flange portion Tn and an attachment surface to the master cylinder CM. Therefore, the input elastic body SN presses the flange portion Tn of the input piston PK against a bottom portion of the input cylinder CN in the direction of the central axis Jm.

When not braking, a stepped portion of the master piston PM abuts against the large diameter bottom portion of the master cylinder CM, and the flange portion Tn of the input piston PK abuts against the bottom portion of the input cylinder CN. When not braking, a gap Ks between an end surface Mq of the master piston PM and an end surface Mg of the input piston PK inside the input cylinder CN is set to a predetermined distance ks (referred to as an "initial gap"). That is, the master piston PM and the input piston PK are separated by the predetermined distance ks when the two pistons PM and PK are located at positions (referred to as "initial positions" of the pistons) furthermost in the backward direction Hb (direction opposite to the forward direction Ha) (that is, when not braking). Here, the predetermined distance ks corresponds to a maximum value of the regeneration amount Rg. When the regenerative cooperative control is executed, the gap (also referred to as "separation displacement") Ks is controlled (adjusted) by the adjustment liquid pressure Pc.

When the brake operation member BP is depressed from a state of "Ba=0", the input piston PK is moved from the initial position in the forward direction Ha. At this time, if the adjustment liquid pressure Pc stays at "0", the master piston PM stays in the initial position, so that the gap Ks (a distance between the end surface Mg and the end surface Mq) gradually decreases. On the other hand, when the adjustment liquid pressure Pc is increased from "0", the master piston PM is moved in the forward direction Ha from the initial position thereof. Therefore, the gap Ks can be adjusted by the adjustment liquid pressure Pc independently of the brake operation amount Ba in a range of "0≤Ks≤ks". That is, by adjusting the adjustment liquid pressure Pc, the gap Ks between the input piston PK and the master piston PM is adjusted, and the regenerative cooperative control is achieved.

The input chamber Rn of the regeneration cooperation unit YK and the reaction force chamber Ro of the master unit YM are connected by the simulator fluid path HS. The first on-off valve VA is provided in the simulator fluid path HS. The first on-off valve VA is a normally-closed solenoid valve (on/off valve) having an open position and a closed position. A third reservoir fluid path HT is connected to a portion Bs between the first on-off valve VA of the simulator fluid path HS and the reaction force chamber Ro. The second on-off valve VB is provided in the third reservoir fluid path HT. The second on-off valve VB is a normally-opened solenoid valve (on/off valve) having an open position and a closed position.

The simulator SS is connected to the simulator fluid path HS at a portion Bo between the first on-off valve VA and the reaction force chamber Ro. In other words, the input chamber Rn of the regeneration cooperation unit YK is connected to the simulator SS by the simulator fluid path HS. When the regenerative cooperative control is executed, the first on-off valve VA is set to the open position, and the second on-off valve VB is set to the closed position. Since the second on-off valve VB is in the closed position, the fluid path to the reservoir RV is cut off in the third reservoir fluid path HT. Therefore, the brake liquid BF is moved from the input chamber Rn of the input cylinder CN into the simulator SS. The simulator SS generates an operation force Fp when the brake operation member BP is operated.

The simulator liquid pressure sensor PS is provided in the simulator fluid path HS between the first on-off valve VA and the reaction force chamber Ro so as to detect the liquid pressure (referred to as the "simulator liquid pressure") Ps in the simulator SS. In addition, the input liquid pressure sensor PN is provided in the simulator fluid path HS between the first on-off valve VA and the input chamber Rn so as to detect the liquid pressure (referred to as "input liquid pressure") Pn in the input chamber Rn. Each of the simulator liquid pressure sensor PS and the input liquid pressure sensor PN is provided as one of the above-mentioned brake operation amount sensors BA. The detected liquid pressures Ps and Pn are input to the upper portion controller ECU as the brake operation amount Ba. Since "Ps=Pn" when the first and second on-off valves VA and VB are energized, one of the simulator liquid pressure sensor PS or the input liquid pressure sensor PN can be omitted.

The electric motor MC and the solenoid valves VA, VB, UB, and UC are controlled by the upper portion controller ECU based on various signals (such as Ba). Specifically, in the upper portion controller ECU, the drive signals Va, Vb, Ub, and Uc for controlling the various solenoid valves VA, VB, UB, and UC are calculated. The drive signal Mc for controlling the electric motor MC is calculated in the same way. Based on the drive signals Va, Vb, Ub, Uc and Mc, the solenoid valves VA, VB, UB, UC, and the electric motor MC are driven. The master cylinder liquid pressure Pm may be employed instead of the second adjustment liquid pressure Pc.

<Second Processing Example of Pressure Adjustment Control>

Figure 6:
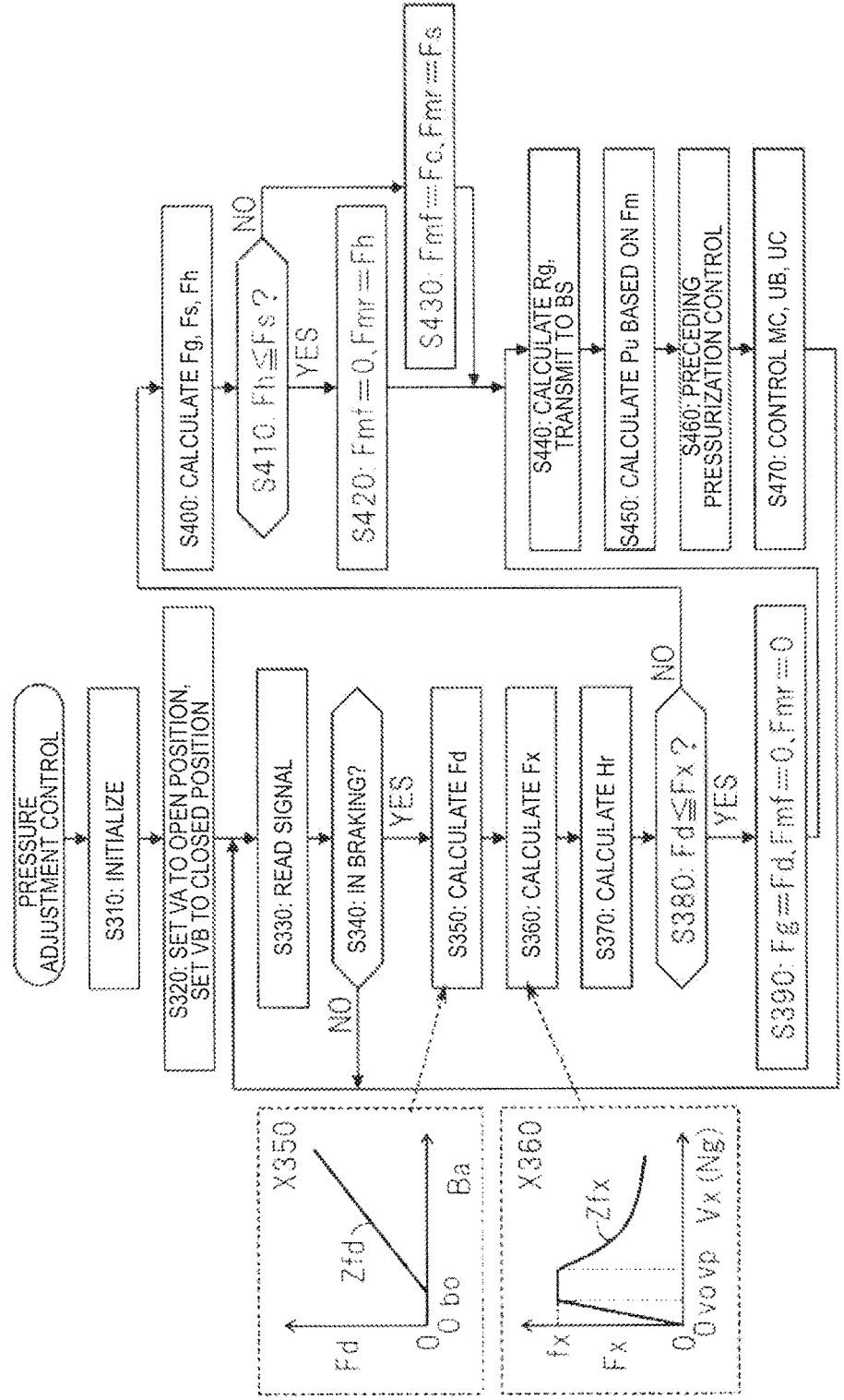
FIG. 6 is a control flowchart for illustrating a second processing example of pressure adjustment control corresponding to the second embodiment.

A second processing example of pressure adjustment control corresponding to the second embodiment will be described with reference to a control flowchart of FIG. 6. In the first processing example, the same adjustment liquid pressure Pa is supplied to all of the four wheel cylinders CWs. In the second processing example, the liquid pressure Pwf of the front wheel cylinder CWf and the liquid pressure Pwr of the rear wheel cylinder CWr are individually controlled within a range of "Pb≥Pc". Processing in steps S310 to S360 is the same as processing in steps S110 to S160, and thus will be briefly described.

In step S310, the brake control device SC is initialized. In step S320, the first and second on-off valves VA and VB are energized, the first on-off valve VA is set to the open position, and the second on-off valve VB is set to the closed position. In step S330, the brake operation amount Ba, the first and second adjustment liquid pressure (detected value) Pb, Pc (or the master cylinder liquid pressure Pm), and the vehicle body speed Vx are read. In step S340, "whether or not brake is being performed" is determined based on the brake operation amount Ba. When "Ba>bo (predetermined value)", the processing moves to step S350. When "Ba≤bo" is satisfied, the processing returns to step S330.

In step S350, the required braking force Fd (target value of a total braking force F) is calculated based on the calculation map Zfd in a block X350 and the operation amount Ba. The required braking force Fd is determined to be "0" in the range where the operation amount Ba is between "0" and the predetermined value bo, and is calculated to monotonically increase from "0" as the operation amount Ba increases when the operation amount Ba is equal to or greater than the predetermined value bo. In step S360, based on the calculation map Zfx of the block X360 and the vehicle body speed Vx (or the generator rotation speed Ng), the maximum regenerative power (maximum value of the generable regenerative braking force) Fx is calculated. When "0≤Vx<vo (predetermined speed)", the maximum regenerative force Fx is calculated to increase as the vehicle body speed Vx increases. When "vo≤Vx<vp (predetermined speed)", the maximum regenerative force Fx is determined to be the upper limit value fx. When "Vx≥vp", the maximum regenerative force Fx is calculated to decrease as the vehicle body speed Vx increases.

In step S370, a braking force distribution ratio (in particular, a ratio of the rear wheel braking force to the total braking force F, which is referred to as "rear wheel ratio Hr") is set. For example, the rear wheel ratio Hr can be determined as a preset constant (predetermined value) hr. In addition, the rear wheel ratio Hr can be determined based on at least one of turning state quantity Ta, the vehicle body speed Vx, and the required braking force Fd. Here, the turning state quantity Ta is a variable representing a turning state of the vehicle, and corresponds to, for example, yaw rate and lateral acceleration.

In step S380, "whether the required braking force Fd is equal to or less than the maximum regenerative force Fx" is determined based on the required braking force Fd and the maximum regenerative force Fx. That is, it is determined whether the required braking force Fd can be achieved only by the regenerative braking force. When "Fd≤Fx", the processing moves to step S390. When "Fd>Fx", the processing moves to step S400.

In step S390, the regenerative braking force (target value) Fg and the friction braking forces (target values) Fmf and Fmr of the front and rear wheels are calculated based on the required braking force Fd. Specifically, the target regenerative braking force Fg is determined to match the required braking force Fd, and the target friction braking forces Fmf and Fmr of the front and rear wheels are calculated to be "0" (that is, "Fg=Fd, Fmf=Fmr=0"). That is, when the regenerative braking force Fg does not reach the maximum regenerative force Fx (when "Fg<Fx"), friction braking is not employed for vehicle deceleration, and the required braking force Fd is achieved only by regenerative braking.

In step S400, the target regenerative braking force Fg, a complementary braking force Fh, and a rear wheel reference force Fs are calculated. The regenerative braking force Fg is calculated so as to match the maximum regenerative force Fx. That is, when the regenerative braking force Fg reaches the maximum regenerative force Fx (when "Fg≥Fx"), "Fg=Fx" is calculated, and the regenerative energy is maximized. The rear wheel reference force Fs is calculated based on the required braking force Fd and the rear wheel ratio Hr. The rear wheel reference force Fs is a value which takes a braking force front-rear ratio with respect to the required braking force Fd (that is, the rear wheel ratio Hr) into consideration, and is used as a reference for achieving the rear wheel ratio Hr. Specifically, the rear wheel ratio Hr is multiplied by the required braking force Fd to calculate the rear wheel reference force Fs (that is, "Fs=Hr×Fd"). The complementary braking force Fh is calculated based on the required braking force Fd and the maximum regenerative force Fx. The complementary braking force Fh is a braking force to be complemented by friction braking to achieve the required braking force Fd. Specifically, the maximum regenerative force Fx is subtracted from the required braking force Fd to calculate the complementary braking force Fh (that is, "Fh=Fd−Fx").

In step S410, the complementary braking force Fh and the rear wheel reference force Fs are compared, and it is determined whether "the complementary braking force Fh is equal to or less than the rear wheel reference force Fs". When "Fh≤Fs", the processing moves to step S420. When "Fh>Fs", the processing moves to step S430.

In step S420, the front wheel friction braking force Fmf is determined to be "0", and the rear wheel friction braking force Fmr is calculated to match the complementary braking force Fh (that is, "Fmf=0, Fmr=Fh"). When the complementary braking force Fh is equal to or less than the rear wheel reference force Fs, no front wheel friction braking force is generated on the front wheel WHf, and only the regenerative braking force Fg is applied. Then a friction braking force Fmr is generated on the rear wheel WHr so as to satisfy the required braking force Fd.

On the other hand, in step S430, the rear wheel friction braking force Fmr is calculated to match the rear wheel reference force Fs, and the front wheel friction braking force Fmf is calculated to match a value (referred to as "front wheel indicating force") Fc obtained by subtracting the rear wheel reference force Fs from the complementary braking force Fh (that is, "Fmf=Fc=Fh−Fs, Fmr=Fs"). When the complementary braking force Fh is greater than the rear wheel reference force Fs, the rear wheel friction braking force Fmr is set to the rear wheel reference force Fs in consideration of the rear wheel ratio Hr, and insufficient amount thereof with respect to the required braking force Fd (=Fc) is determined as the front wheel friction braking force Fmf.

In step S440, the regeneration amount Rg is calculated based on the regenerative braking force Fg. The regeneration amount Rg is a target value of the regeneration amount of the generator GN. The regeneration amount Rg is transmitted from the upper portion controller ECU to the drive controller ECD via the communication bus BS.

In step S450, target liquid pressure Pt (=Ptf, Ptr) is calculated based on the target value Fm (=Fmf, Fmr) of the friction braking force. That is, the friction braking force Fm is converted into the liquid pressure to determine the target liquid pressure Pt. The rear wheel target liquid pressure Ptr is a target value of the liquid pressure of the rear wheel cylinder CWr corresponding to the first adjustment liquid pressure Pb. The front wheel target liquid pressure Ptf is a target value of the liquid pressure of the front wheel cylinder CWf corresponding to the second adjustment liquid pressure Pc.

In step S460, the preceding pressurization control is executed based on the vehicle body speed Vx (or the generator rotation speed Ng) and the first and second adjustment liquid pressures Pb and Pc (detected values of the first and second adjustment liquid pressure sensors PB, PC). As in the first embodiment, the "preceding pressurization control" is a control in which the front wheel brake liquid pressure Pwf (=Pc) is increased from "0" to predetermined liquid pressure pp and maintained at the value before the replacement operation between "regenerative braking force Fg by regenerative generator GN" and "front wheel friction braking force Fmf by adjustment liquid pressure Pc" is started. The replacement operation is started when the processing of step S430 is started (that is, when step S410 is negative for the first time) as the vehicle body speed Vx (as a result, the maximum regenerative force Fx) decreases. Therefore, in the preceding pressurization control, when the processing of step S420 is executed, the front wheel target liquid pressure Ptf (as a result, the actual adjustment liquid pressure Pc) is slightly increased to the predetermined liquid pressure pp.

In step S470, the electric motor MC is controlled based on the front wheel target liquid pressure Ptf and the rear wheel target liquid pressure Ptr. As in the first embodiment, the target liquid pressure Pt (=Ptf, Ptr) is time-differentiated, and the liquid pressure change amount dP is calculated. The target flow rate Qt is calculated by adding up the reference flow rate Qo based on the target liquid pressure Pt and the adjustment flow rate Qh based on the liquid pressure change amount dP (that is, "Qt=Qo+Qhf+Qhr"). Then, the target rotation speed Nt is determined based on the target flow rate Qt, and the rotation speed feedback control is executed such that the actual rotation speed Na approaches and matches the target rotation speed Nt.

In step S470, when at least one of the front wheel and rear wheel liquid pressure change amounts dPf and dPr is larger than "0", a sum of the front wheel and rear wheel adjustment flow rates Qhf and Qhr ("Qhf+Qhr", which is referred to as a "total flow rate") is calculated to be larger than "0". As the front wheel and rear wheel liquid pressure change amounts dPf and dPr increase (for example, when the brake operation member BP is suddenly operated and a rapid increase in pressure is required), the total flow rate (Qhf+Qhr) is determined to be larger, and the target rotation speed Nt is calculated to be larger. That is, the target rotation speed Nt of the electric pump DC (as a result, the actual rotation speed Na) is increased in accordance with a pressure increase gradient of the brake liquid pressures Pwf and Pwr, and the discharge flow rate is increased. Meanwhile, "when the first and second adjustment liquid pressures Pb and Pc are maintained constant" and "when the first and second adjustment liquid pressures Pb and Pc are decreased", the reference flow rate Qo is sufficient for the discharge flow rate of the electric pump DC. In these cases, the total flow rate (Qhf+Qhr) is calculated to be "0", and the increased target rotation speed Nt is decreased.

In step S470, the first and second pressure adjustment valves UB and UC are controlled based on the front wheel target liquid pressure Ptf and the rear wheel target liquid pressure Ptr. As in the first embodiment, the required energization amount Is (=Isf, Isr) is determined based on the liquid pressure change amount dP (=dPf, dPr). The compensation energization amount Ih (=Ihf, Ihr) is calculated based on the deviation hP (=hPf, hPr) between the front wheel and rear wheel target liquid pressures Ptf, Ptr, and the liquid pressure sensor detected values Pc, Pb. Then, the target energization amount It (=Itf, Itr) is determined based on the required energization amount Is and the compensation energization amount Ih, and the energization amount feedback control is executed based on the target energization amount It. As a result, the two pressure adjustment valves UC and UB are controlled such that the actual adjustment liquid pressures Pc and Pb approach and match the front wheel and rear wheel target liquid pressures Ptf and Ptr.

In the second embodiment, the first adjustment liquid pressure Pb and the second adjustment liquid pressure Pc are independently and separately adjusted within a range of "Pb≥Pc". Accordingly, since the regenerative cooperative control is executed while front-rear distribution of the braking force is taken into consideration, deceleration and stability of the vehicle can be ensured and regenerative energy can be maximized.

Also in the second embodiment, when the front wheel target liquid pressure Ptf (=Pc) is equal to or greater than the predetermined liquid pressure pp, the preceding pressurization is unnecessary, such that the control is prohibited. Since the pressure adjustment unit YC is provided with the check valve GC, when the first and second pressure adjustment valves UB and UC are completely closed, the adjustment liquid pressures Pb and Pc can be kept constant. Further, the adjustment liquid pressures Pb and Pc can be reduced by the valve opening of the pressure adjustment valves UB and UC. Therefore, when "dPf≤0" and "dPr≤0", "Qo=0" is set and the target flow rate Qt is determined to be "0". As a result, rotation of the electric pump DC (=MC) can be stopped (that is, "Nt=0"). When the brake operation member BP is held or returned, the electric motor MC is stopped, and further power saving can be achieved.

<Operation and Effect According to Second Embodiment>

Figure 7:
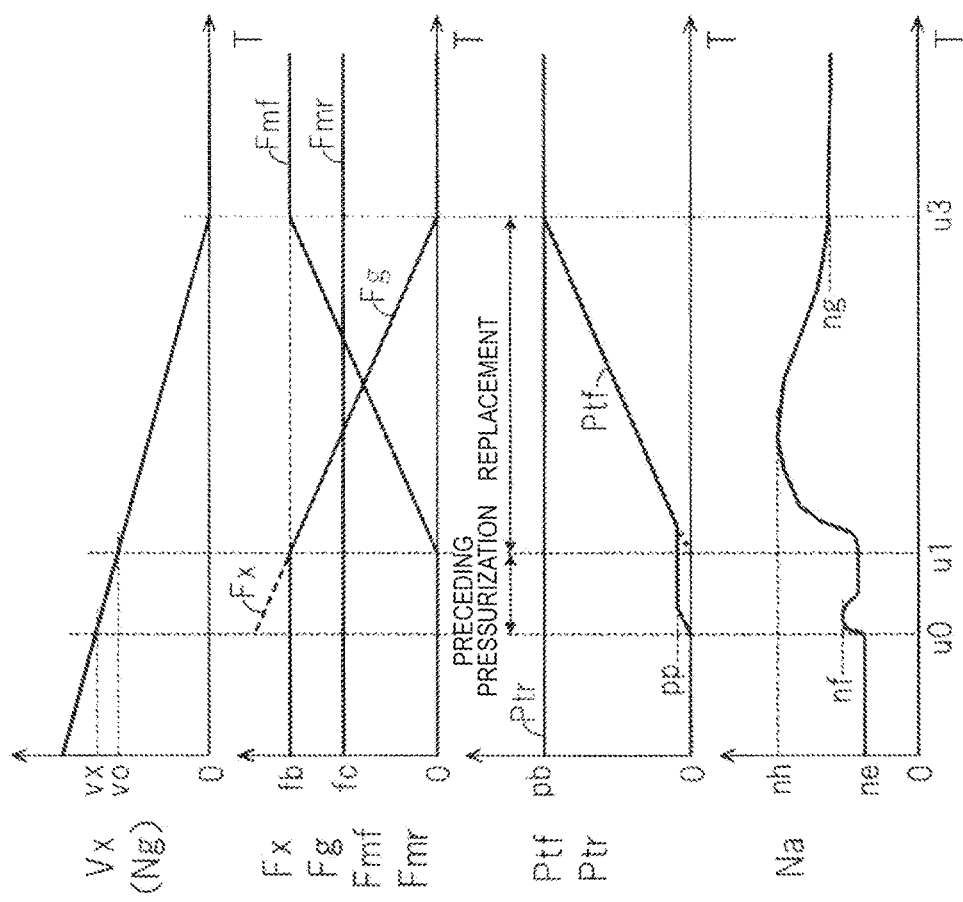
FIG. 7 is a time series diagram for illustrating operation and effects according to the second embodiment.

Operation and effects according to the second embodiment will be described with reference to a time series diagram of FIG. 7. As in the first embodiment, a situation in which the required braking force Fd is maintained constant and the vehicle body speed Vx is reduced is assumed in the diagram.

A state of "Fd=fb+fc" is maintained. Since "Vx>vx" is satisfied up to a time point u0, "Fg=fb, Fmf=0, and Fmr=fc" is determined. Accordingly, "Ptf=0, Ptr=pb" is calculated, and the rotation speed Na is driven by the value ne. At the time point u0, since "the vehicle body speed Vx is equal to or less than the threshold speed vx", which is the start condition of the preceding pressurization control, is satisfied, an increase in the front wheel target liquid pressure Ptf is started. The front wheel target liquid pressure Ptf (as a result, adjustment liquid pressure Pc) is gradually increased to the predetermined liquid pressure pp with a predetermined increase gradient so as to avoid the influence on the vehicle deceleration, and is maintained at the predetermined liquid pressure pp.

At a time point u1, since the maximum regenerative power Fx is reduced as the vehicle body speed Vx decreases, the regenerative braking force Fg is reduced. The front wheel friction braking force Fmf is increased such that the decrease in the regenerative braking force Fg is compensated and the total braking force F of the vehicle matches the required braking force Fd. Then, the front wheel target liquid pressure Ptf is increased from the predetermined liquid pressure pp in accordance with the increase in the front wheel friction braking force Fmf. That is, at the time point u1 (after the preceding pressurization is performed), the replacement operation between the regenerative braking force Fg and the friction braking force Fmf by the adjustment liquid pressure Pc is started. As the front wheel target liquid pressure Ptf increases, the rear wheel liquid pressure change amount dPf increases, so that the rotation speed Na is increased to the value nh. At a time point u2, if the replacement operation is completed, the front wheel target liquid pressure Ptf (=Pc) is maintained constant. Since "dPf=0", the rotation speed Na is decreased to a value ng.

Also in the second embodiment, the same effect as that of the first embodiment is obtained. In the brake control device SC, since the electric pump DC is controlled based on the liquid pressure change amount dP, power saving is achieved. Specifically, when "dP≤0", the electric pump DC is stopped or driven at a low rotation speed. Then, when "dP>0", the electric pump DC is controlled such that the target rotation speed Nt (as a result, the actual rotation speed Na) is larger as the liquid pressure change amount dP is larger. Thereafter, when the liquid pressure change amount dP becomes "0" or less again, the electric pump DC is stopped or driven at a low speed.

When the front wheel brake liquid pressure Pwf is increased from "0" in the replacement operation, first, the brake liquid BF corresponding to the initial consumption liquid amount needs to be supplied to the front wheel cylinder CWf. Since the brake liquid BF corresponding to the amount is supplied before the replacement operation by the preceding pressurization control, the adjustment accuracy and responsiveness of the brake liquid pressure Pw can be improved. In addition, since sudden rotation of the electric pump DC is avoided, the operation noise is reduced. In addition, in the second embodiment, since the first adjustment liquid pressure Pb and the second adjustment liquid pressure Pc are independently and separately adjusted, the energy regenerated by the regenerative cooperative control is maximized, and thus the deceleration and the direction stability of the vehicle can be ensured.

OTHER EMBODIMENTS

Hereinafter, other embodiments will be described. In other embodiments, the same effect as described above (improvement of liquid pressure responsiveness in the replacement operation and the like) can be achieved.

A combination of the tandem type master cylinder CM and the pressure adjustment unit YA in the first embodiment and a combination of the single type master cylinder CM and the pressure adjustment unit YC in the second embodiment are exemplified. These configurations can be combined. In the equivalent pressure adjustment, the master unit YM having the tandem type master cylinder CM and the pressure adjustment unit YA can be combined. In this configuration, the adjustment liquid pressure Pa is supplied to the servo chamber Rs. In the independent pressure adjustment, the pressure adjustment unit YC is combined with the tandem type master cylinder CM in which the front and rear type fluid path is employed. The first adjustment liquid pressure Pb is supplied to the rear wheel cylinder CWr, and the second adjustment liquid pressure Pc is supplied to the front wheel cylinder CWf.

In the above embodiments, the generator GN is provided on the front wheel WHf, and may be provided in the rear wheel WHr. That is, the rear wheel WHr can be a regenerative wheel. In the second embodiment, in the configuration in which the generator GN is provided in the rear wheel WHr, the first adjustment liquid pressure Pb is introduced into the servo chamber Rs (or the front wheel cylinder CWf), and the second adjustment liquid pressure Pc is introduced into the rear wheel wheel cylinder CWr. Therefore, in the replacement operation, the rear wheel target liquid pressure Ptr (=Pc) is increased from the state of "Ptr=0" so as to compensate for the decrease in the maximum regenerative force Fx. Then, in the preceding pressurization control, the rear wheel target liquid pressure Ptr is gradually increased to the predetermined liquid pressure pp before the replacement operation is started. Similarly, when the rear wheel target liquid pressure Ptr (=Pc) is equal to or greater than the predetermined liquid pressure pp, the preceding pressurization control is prohibited.

The invention claimed is:

1. A brake control device for a vehicle including a regenerative generator connected to one or more of wheels of the vehicle, a rotation member fixed to one or more of the wheels, and a friction member configured to be pressed against the rotation member, the brake control device for the vehicle comprising:
- a pressure adjustment unit including an electric pump and a pressure adjustment valve, and configured to adjust adjustment liquid pressure of a pressure adjustment fluid path between the electric pump and the pressure adjustment valve; and
- a controller configured to control the electric pump and the pressure adjustment valve, wherein the controller is configured to
- before starting a replacement operation to replace a regenerative braking force by the regenerative generator with a friction braking force by the adjustment liquid pressure, perform preceding pressurization to increase the adjustment liquid pressure from zero and maintain the adjustment liquid pressure at a predetermined liquid pressure which causes an entire sliding surface of a friction material of the friction member to come into contact with the rotation member without affecting deceleration of the vehicle, and
- after performing the preceding pressurization, increase the adjustment liquid pressure greater than the predetermined liquid pressure by increasing a rotation speed of the electric pump, and then execute the replacement operation.

2. The brake control device for a vehicle according to claim 1, wherein
the controller is configured to
- calculate a liquid pressure change amount by using target liquid pressure corresponding to an operation amount of a brake operation member of the vehicle,
- when the liquid pressure change amount is zero or negative, maintain the rotation speed of the electric pump at zero or a constant value, and
- when the liquid pressure change amount is greater than zero, increase the rotation speed of the electric pump as the liquid pressure change amount is larger.

3. The brake control device for a vehicle according to claim 1, wherein the preceding pressurization is prohibited when the adjustment liquid pressure before the preceding pressurization is equal to or greater than the predetermined liquid pressure.

* * * * *